US012164828B2

(12) United States Patent
Tiwari et al.

(10) Patent No.: US 12,164,828 B2
(45) Date of Patent: Dec. 10, 2024

(54) METHOD AND SYSTEM FOR ASSIGNING UNIQUE VOICE FOR ELECTRONIC DEVICE

(71) Applicant: SAMSUNG ELECTRONICS CO., LTD., Suwon-si (KR)

(72) Inventors: Sourabh Tiwari, Bangalore (IN); Akshit Jindal, Bangalore (IN); Saksham Goyal, Bangalore (IN); Vinay Vasanth Patage, Bangalore (IN); Ravibhushan B. Tayshete, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 226 days.

(21) Appl. No.: 17/344,293

(22) Filed: Jun. 10, 2021

(65) Prior Publication Data

US 2022/0137917 A1 May 5, 2022

(30) Foreign Application Priority Data

Oct. 30, 2020 (IN) .............................. 202041047462

(51) Int. Cl.
*G06F 3/16* (2006.01)
*G10L 13/02* (2013.01)
(Continued)

(52) U.S. Cl.
CPC .............. *G06F 3/165* (2013.01); *G10L 13/02* (2013.01); *G10L 15/08* (2013.01); *G10L 15/22* (2013.01);
(Continued)

(58) Field of Classification Search
CPC ......... G06F 3/165; G06F 3/167; G10L 13/02; G10L 15/08; G10L 15/22; G10L 21/003;
(Continued)

(56) References Cited

U.S. PATENT DOCUMENTS 10,522,143 B2   12/2019  Chandrasekaran et al.
10,599,390 B1 *  3/2020  Brahmbhatt .......... G06F 3/0482
(Continued)

FOREIGN PATENT DOCUMENTS

CN   111276120 A   6/2020
JP   2009-72910 A   4/2009
(Continued)

OTHER PUBLICATIONS

Berger, Thomas, et al. "Speaking voice in children and adolescents: normative data and associations with BMI, Tanner stage, and singing activity." Journal of Voice 33.4 (2019): 580-e21-e30 (Year: 2019).*

(Continued)

*Primary Examiner* — Jesse S Pullias
*Assistant Examiner* — Michael C. Lee
(74) *Attorney, Agent, or Firm* — Sughrue Mion, PLLC

(57) ABSTRACT

A method in an interactive computing-system includes pre-processing an input natural-language (NL) from a user command based on natural language processing (NLP) for classifying speech information and non-speech information, obtaining an NLP result from the user command, fetching a device specific information from one or more IoT devices operating in an environment based on the NLP result, generating one or more contextual parameters based on the NLP result and the device specific information, selecting at least one speaker embedding stored in a database for the one or more IoT devices based on the one or more contextual parameters, and outputting the selected at least one speaker embedding for playback to the user.

20 Claims, 18 Drawing Sheets

(51) Int. Cl.
  *G10L 15/08* (2006.01)
  *G10L 15/22* (2006.01)
  *G10L 21/003* (2013.01)
  *G10L 21/0208* (2013.01)

(52) U.S. Cl.
  CPC ........ *G10L 21/003* (2013.01); *G10L 21/0208* (2013.01)

(58) Field of Classification Search
  CPC ..... G10L 21/0208; G10L 13/04; G10L 25/78; G10L 13/033
  See application file for complete search history.

(56) References Cited

U.S. PATENT DOCUMENTS

| | | | |
|---|---|---|---|
| 10,650,816 | B2 | 5/2020 | Lee et al. |
| 10,664,741 | B2 | 5/2020 | Gibbs et al. |
| 10,832,673 | B2* | 11/2020 | Gordon .................. G06F 3/167 |
| 11,260,536 | B1* | 3/2022 | Kim ....................... B25J 11/001 |
| 2013/0297053 | A1* | 11/2013 | Ojanpera ............... G06F 16/65 700/94 |
| 2016/0259775 | A1* | 9/2016 | Gelfenbeyn ............ G06F 40/35 |
| 2016/0378747 | A1* | 12/2016 | Orr ........................ G10L 15/26 704/9 |
| 2018/0286384 | A1* | 10/2018 | Pogorelik ................ A47L 5/30 |
| 2019/0227096 | A1* | 7/2019 | Chowdhary ............ G10L 21/10 |
| 2019/0287513 | A1* | 9/2019 | Alameh .................. G10L 17/00 |
| 2019/0354990 | A1 | 11/2019 | Trim et al. |
| 2019/0385588 | A1 | 12/2019 | Park |
| 2020/0013395 | A1 | 1/2020 | Jeong et al. |
| 2020/0034108 | A1 | 1/2020 | Mozer |
| 2020/0035215 | A1 | 1/2020 | Yang et al. |
| 2020/0118548 | A1* | 4/2020 | Huang .................... G10L 15/22 |
| 2020/0143235 | A1* | 5/2020 | Seko ....................... G10L 13/00 |
| 2020/0302927 | A1 | 9/2020 | Andruszkiewicz et al. |
| 2020/0372897 | A1* | 11/2020 | Battenberg ............... G06N 7/01 |
| 2020/0410978 | A1* | 12/2020 | Bender .................... G06N 20/00 |
| 2021/0182557 | A1* | 6/2021 | Koch ....................... G06V 20/20 |
| 2021/0217423 | A1* | 7/2021 | Rakshit ................... G10L 15/22 |
| 2022/0068272 | A1* | 3/2022 | Kwatra ................. G10L 15/063 |

FOREIGN PATENT DOCUMENTS

| | | |
|---|---|---|
| JP | 2019-168623 A | 10/2019 |
| KR | 10-2019-0074558 A | 6/2019 |
| KR | 10-2019-0096860 A | 8/2019 |
| KR | 10-2019-0104278 A | 9/2019 |
| KR | 10-2019-0104941 A | 9/2019 |

OTHER PUBLICATIONS

Communication dated Sep. 9, 2021, issued by the International Searching Authority in counterpart International Application No. PCT/KR2021/007093 (PCT/ISA/210).
Mlhal M., "Samsung introduces celebrity voices Bixby in South Korea," Apr. 7, 2020, (3 total pages).
"Speak to IoT-Connecting Everything through Voice", Smart India, speaktoiot.com, Apr. 30, 2019, (8 pages).
Communication dated Jun. 3, 2022 issued by the Indian Patent Office in counterpart Indian Application No. 202041047462.
Park, Chunjong et al., "Augmenting Conversational Agents with Ambient Acoustic Contexts", 22nd International Conference on Human-Computer Interaction with Mobile Devices and Services (MobileHCI '20), Oct. 5-8, 2020. (9 pages total).
Communication issued Nov. 29, 2023 by the European Patent Office in European Patent Application No. 21886473.4.
Communication dated May 29, 2024, issued by Intellectual Property India in Indian Application No. 202041047462.

* cited by examiner

METHOD AND SYSTEM FOR ASSIGNING UNIQUE VOICE FOR ELECTRONIC DEVICE

CROSS-REFERENCE TO RELATED APPLICATION

This application is based on and claims priority under 35 U.S.C. § 119 to Indian Patent Application No. 202041047462, filed on Oct. 30, 2020, in the Indian Patent Office, the disclosure of which is incorporated by reference herein in its entirety.

BACKGROUND

Field

The present disclosure, in general, relates to generating of voice messages for electronic devices. More particularly the present disclosure relates to assigning of a unique voice for one or more electronic devices and thereby generating of the assigned voice for playback to a user.

Description of the Related Art

With the recent developments in electronic devices, interactive computer systems, for example, virtual assistant devices have evolved to perform various activities to assist users. A virtual assistant device is a device which is generally communicates with multiple IoT (Internet of things) devices for controlling those devices. In an example, the virtual assistant device may work as an independent device or may provide as an application or as an extended browser running on a computing device included in a cloud network or in embedded systems or the like. The term, interactive computer system and the virtual assistant device may be alternatively used hereinafter without deviating scope of the present disclosure.

The virtual assistant devices assist a user in various ways, for example, monitoring home, household IoT devices, providing suggestion to a query and the like. For example, digital appliances (DA) like a smart fridge, a smart TV, a smart washing machine, etc. use voice assistants to interact with the user and answer their commands. For the assigned task, the voice assistant responds to the user via a voice generated by a Text to Speech (TTS) generation system. Currently, a voice or speech generated by every smart appliance sounds similar as the TTS system does not differ in any way based on the device. These, the virtual assistant device has similar robotic voice response. For example, the current state of the art technique at best provides the user to select Hollywood character voice as a voice assistant voice. However, there is no emotional connection between the user and the voice assistant device. Thus, the voices generated by such computer interactive systems are robotic in nature and hence emotionless. This leads to no emotional connection between the user and the voice assistant device. If all digital appliances have their unique voice, then users will feel more connected and attached to the appliances, as they do with other humans/animals.

Thus, there is a need for a solution that overcomes the above deficiencies.

SUMMARY

This summary is provided to introduce a selection of concepts, in a simplified format, that are further described in the detailed description of the inventive concept. This summary is neither intended to identify key or essential inventive concepts of the present disclosure and nor is it intended for determining the scope of the inventive concept.

According to an embodiment of the present disclosure, a method in an interactive computing-system includes pre-processing an input natural-language (NL) from a user command based on natural language processing (NLP) for classifying speech information and non-speech information, obtaining an NLP result from the user command, fetching a device specific information from one or more IoT devices operating in an environment based on the NLP result, generating one or more contextual parameters based on the NLP result and the device specific information, selecting at least one speaker embedding stored in a database for the one or more IoT devices based on the one or more contextual parameters, and outputting the selected at least one speaker embedding for playback to the user.

The method may further include processing the selected at least one speaker embedding based on a text to speech mechanism to playback in a natural language to the user.

The obtaining of the NLP result may include obtaining acoustic information forming a part of the non-speech information to cause generation of the one or more contextual parameters based on the acoustic information.

The generating of the one or more contextual parameters may include selecting a voice embedding from the at least one speaker embedding for playback by an IoT device of the one or more IoT devices.

The pre-processing may include steps of collecting a plurality of audio samples from a plurality of speakers to generate one or more speaker embeddings; and storing the generated one or more speaker embeddings in the database for selection of the one or more speaker embeddings for the one or more IoT devices.

The method may further include artificially infusing a human emotion into the generated one or more speaker embeddings, wherein the generated one or more speaker embeddings include different types of voice tones and textures for the plurality of audio samples, and storing the generated one or more speaker embeddings with human emotions in the database.

The pre-processing may include extracting a device specific information for the one or more IoT devices operating in a networking environment, correlating the device specific information with the at least one speaker embedding to generate a map of a set of speaker embeddings for each of the one or more IoT devices based on the device specific information, assigning a distinct voice from the set of speaker embeddings to each of the one or more IoT devices based on the correlation, and storing the assigned set of speaker embeddings into the database as the map for selection of encoded speaker embeddings for the one or more IoT devices.

The pre-processing may include extracting a device specific information for one or more IoT devices operating in a networking environment, identifying similar IoT devices from the one or more IoT devices operating in the environment based on the device specific information, correlating the device specific information with the at least one speaker embedding to generate a map of a set of speaker embeddings for each of the identified similar IoT devices based on the device specific information, assigning a distinct voice to each of the identified similar IoT devices comprised in the set of speaker embeddings, and storing the assigned set of speaker embeddings into the database as the map for selection of the speaker embeddings for the one or more IoT devices.

The obtaining of the NLP result may include determining one of success, failure, or follow-up of an IoT event on the one or more IoT devices due to the user command or device specific events, wherein a result of determination corresponds to the NLP result.

The obtaining of the acoustic information from the non-speech information may include determining one or more audio events of the surrounding environment of the one or more IoT devices, wherein the one or more audio events of the surrounding environment correspond to the acoustic information.

According to another embodiment of the present disclosure, an interactive computing-system includes one or more processors, and a memory configured to store instructions executable by the one or more processors where the one or more processors are configured to pre-process an input natural-language (NL) from a user command based on natural language processing (NLP) for classifying speech information and non-speech information, obtain an NLP result from the user command, fetch a device specific information from one or more IoT devices operating in an environment based on the NLP result; generate one or more contextual parameters based on the NLP result and the device specific information, select at least one speaker embedding stored in a database for the one or more IoT devices based on the one or more contextual parameter, and output the selected at least one speaker embedding for playback to the user.

The one or more processors may be further configured to process the selected at least one speaker embedding based on a text to speech mechanism to playback in a natural language to the user.

The one or more processors may be further configured to obtain acoustic information forming a part of the non-speech information to cause generation of the one or more contextual parameters based on the acoustic information.

The one or more processors may be further configured to select a voice embedding from the at least one speaker embedding for playback by an IoT device of the one or more IoT devices.

The one or more processors may be further configured to collect a plurality of audio samples from a plurality of speakers to generate one or more speaker embeddings, and store the generated one or more speaker embeddings with human emotions in the database for selection of the one or more speaker embeddings for the one or more IoT devices.

The one or more processors may be further configured to artificially infuse a human emotion into the generated one or more speaker embeddings, wherein the generated one or more speaker embeddings include different types of voice tones and textures for the plurality of audio samples, and store the generated one or more speaker embeddings with human emotions in the database.

The one or more processors may be further configured to extract a device specific information for the one or more IoT devices operating in a networking environment, correlate the device specific information with the at least one speaker embedding to generate a map of a set of speaker embeddings for each of the IoT devices based on the device specific information, assign a distinct voice from the set of speaker embeddings to each of the one or more IoT devices based on the correlation, and store the assigned set of speaker embeddings into the database as the map for selection of encoded speaker embeddings for the one or more IoT devices.

The one or more processors may be further configured to extract a device specific information for the one or more IoT devices operating in a networking environment, identify similar IoT devices from the one or more IoT devices operating in the environment based on the device specific information, correlate the device specific information with the at least one speaker embedding to generate a map of a set of speaker embeddings for each of the identified similar IoT devices based on the device specific information, assign a distinct voice to each of the identified similar IoT devices comprised in the set of speaker embeddings, and store the assigned set of speaker embeddings into the database as the map for selection of the speaker embeddings for the one or more IoT devices.

The one or more processors may be further configured to determine one of success, failure, or follow-up of an IoT event on the one or more IoT devices due to the user command or device specific events, wherein a result of determination corresponds to the NLP result.

The one or more processors may be further configured to determine one or more audio events of the surrounding environment of the one or more IoT devices, wherein the one or more audio events of the surrounding environment correspond to the acoustic information.

BRIEF DESCRIPTION OF THE DRAWINGS

These and other features, aspects, and advantages of the disclosure will become better understood when the following detailed description is read with reference to the accompanying drawings in which like characters represent like parts throughout the drawings, wherein.

Figure 1:
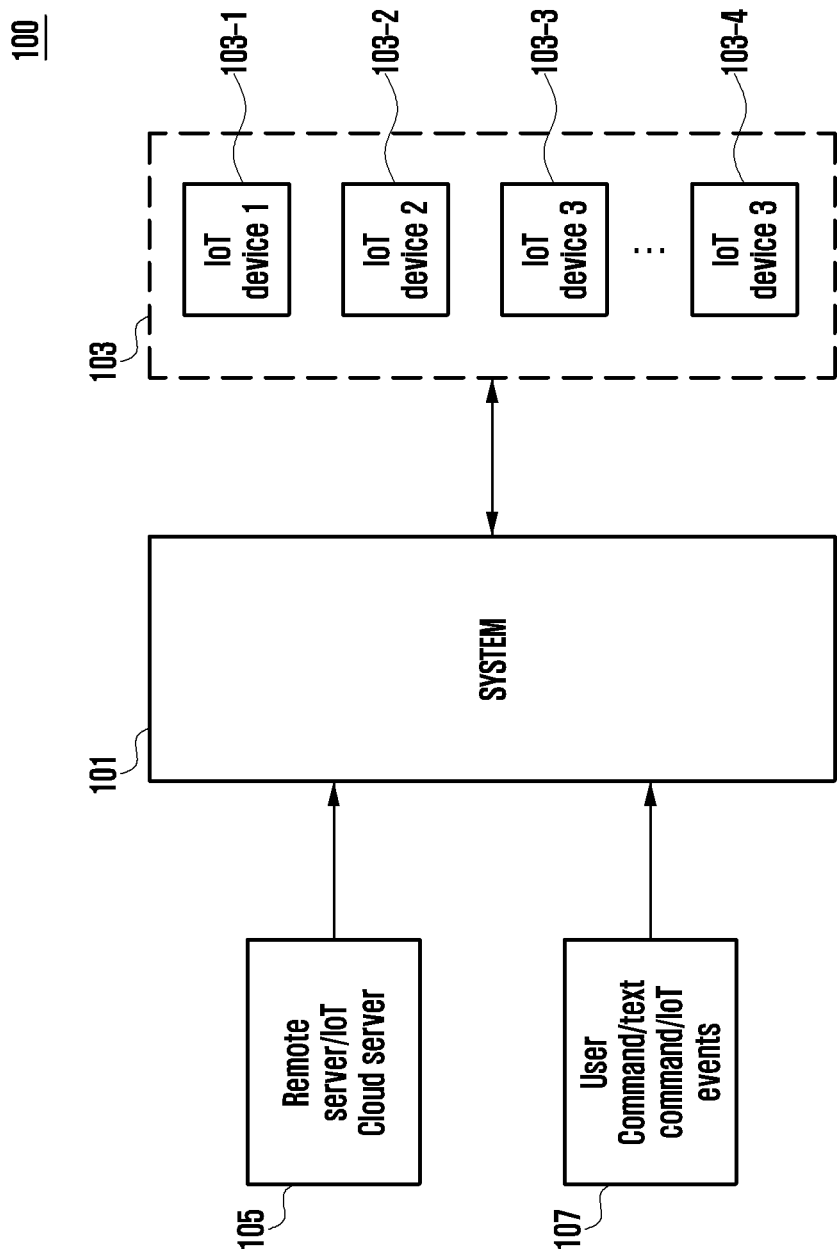
FIG. 1 illustrates a networking environment 100 implementing a system 101 for rendering voice assistance to a user, in accordance with an embodiment of the present disclosure.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the disclosure. Furthermore, in terms of the construction of the device, one or more components of the device may have been represented in the drawings by conventional symbols, and the drawings may show only those specific details that are pertinent to understanding of the embodiments of the disclosure so as not to obscure the drawings with details that will be readily apparent to those of ordinary skill in the art having benefit of the description herein.

DETAILED DESCRIPTION

For the purpose of promoting an understanding of the principles of the inventive concept, reference will now be made to the embodiments illustrated in the drawings and specific language will be used to describe the same. It will nevertheless be understood that no limitation of the scope of the inventive concept is thereby intended, such alterations and further modifications in the illustrated system, and such further applications of the principles of the inventive concept as illustrated therein being contemplated as would normally occur to one skilled in the art to which the inventive concept relates.

It will be understood by those skilled in the art that the foregoing general description and the following detailed description are explanatory of the inventive concept and are not intended to be restrictive thereof.

Reference to "an aspect", "another aspect" or similar language throughout this specification means that a particular feature, structure, or characteristic described in connection with the embodiment is included in at least one embodiment of the disclosure. Thus, appearances of the phrase "in an embodiment", "in another embodiment" and similar language throughout this specification may, but do not necessarily, all refer to the same embodiment.

The terms "comprise", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprise . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which the inventive concept belongs. The system, methods, and examples provided herein are illustrative only and not intended to be limiting.

Embodiments of the disclosure will be described below in detail with reference to the accompanying drawings.

FIG. 1 illustrates a networking environment 100 implementing a system 101 for rendering voice assistance to a user, in accordance with an embodiment of the disclosure. In particular, the present disclosure provides or assigns unique voice for each and every digital device, electronic devices or IoT devices which are connected with the system 101. As an example, the system 101 may include at least, but not limited to, a computer interactive system, a virtual assistant system, or an electronic system and the like. The providing of unique or distinct voices for each and every digital device, IoT devices, or electronic devices may be, for example, but not limited to, conversational style attribute in natural human language infused with emotions, dynamic response of the system in response to the query of the user, or occurrence of a device event infused with emotions, vocal humanly responses, and the like. Accordingly, as an example, consider a scenario where the user has provided a command to a smart washing machine for washing cloth by uttering, e.g., "Start Washing in Quick mode." The system 101 thus processes the command and determines IoT device characteristics. The IoT device characteristics, for example, a type of IoT device. In this case, it will determine the IoT device to be a washing machine, capacity of the IoT device, running status of the IoT device, and the IoT device as being overloaded and the like. Accordingly, the system 101 may assign and generate a unique response. The unique response, for example, but not limited to, an utterance like "Started washing in a quick mode" in a fatigued voice with motor grunting sounds in the background, in case the washing machine is determined to be overloaded with cloths and has been running for 8 hrs thereby providing a humanly connection with the user. On the contrary, a conventional state of the art voice assistant device would have provided a robotic type of response without any emotions infused with it.

Examples of the environment 100 may include, but are not limited to, IoT enabled homes, offices, buildings, hospitals, schools, public places and the like. In other words, an environment implementing IoT devices may be understood to be an example of the environment 100. Examples of the devices in which the system 101 may be implemented include, but are not limited to, a smartphone, a tablet, a distributed computing system, a server, and a cloud server, or dedicated embedded systems.

As shown in FIG. 1, in an example, the system 101 may be commutatively coupled with a plurality of IoT devices 103-1, 103-2, 103-3, and 103-4. In an example, the IoT devices 103-1, 103-2, 103-3, and 103-4 may include, but are not limited to, a washing machine, a television, a mobile device, a speaker, a refrigerator, an air conditioner, heating appliance, a monitoring system, home appliance, an alarm system, a sensor. As would be understood, each of the aforementioned examples is a smart device in the sense that it is able to connect with one or more remote servers or IoT cloud server 105 and be a part of a networking environment, such as the environment 100. In an example, the system 101 may be coupled with one or more of remote servers or IoT cloud server 105 for accessing data, processing of information, and the like. In an implementation, the IoT devices 103-1, 103-2, 103-3, and 103-4 may also be used while not being connected to any networking environment, i.e., in offline mode. In a further implementation, the system may be further coupled with any electronic devices other than IoT devices. Herein, the data may include, but not limited to, device type, device capabilities, hardware features of the devices, device location in home IoT setup, IoT device usage history, user history, etc. In an example, the generated data may be stored in the remote or the IoT could server 105. Furthermore, the system 101 may be configured to receive one or more commands as input from the user or other devices present in the vicinity of the user. As an example, the other devices may also include an IoT device. Furthermore, the system 101 may be configured to receive one or more commands as a voice or in the form of text or any IoT event 107 as an input from the user or other devices present in the vicinity of the user or from any digital devices. As an example, the other devices may also include an IoT device, or a smartphone, a laptop, a tablet, and the like. As an example, the term, devices, electronic devices, digital devices and IoT devices can be alternately used without deviating the scope of the inventive concept.

Figure 2:
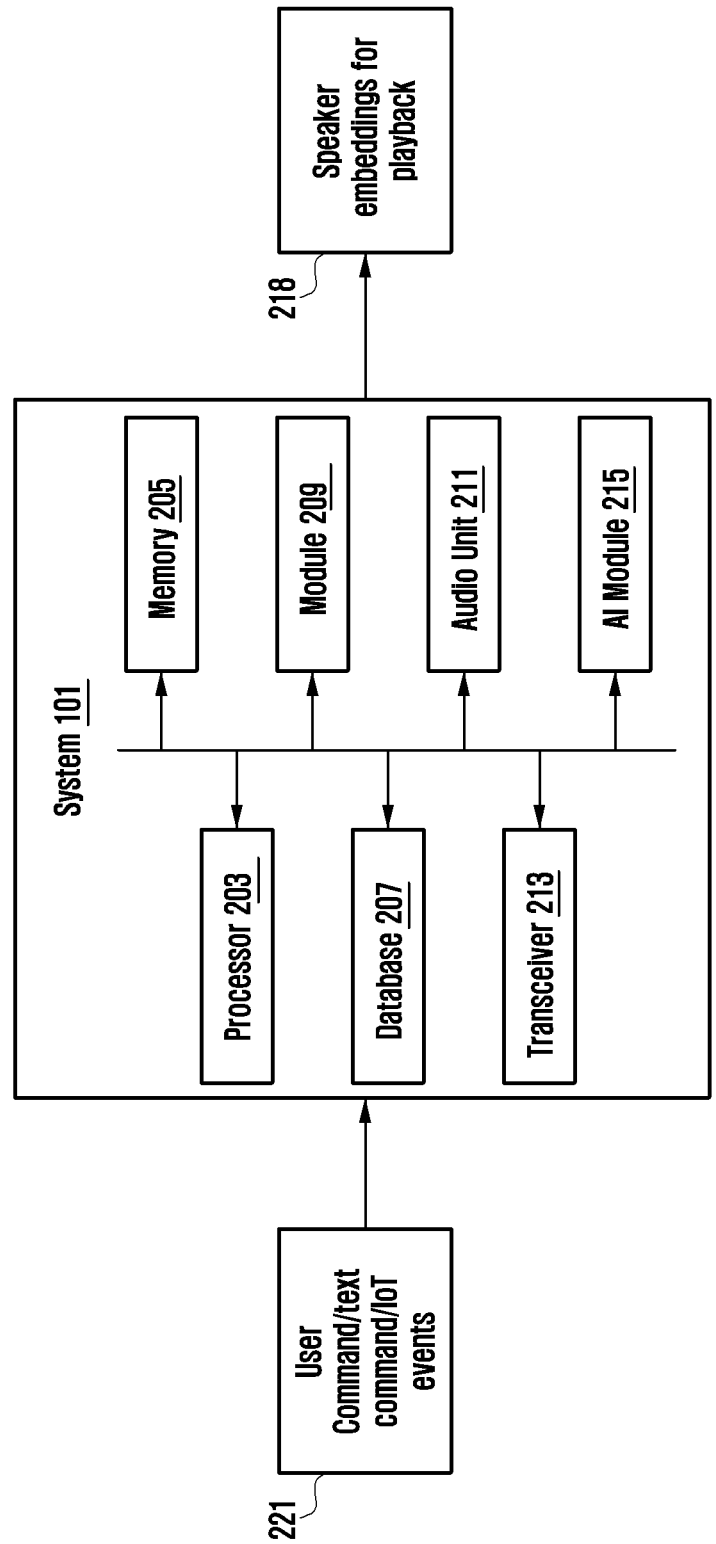
FIG. 2 illustrates a schematic block diagram of the system 101 for providing device-action notifications to the user, in accordance an embodiment of the present disclosure.

FIG. 2 illustrates a schematic block diagram of the system 101 for providing device-action notifications to the user, in accordance an embodiment of the disclosure. In an example embodiment, the system 101 may include a processor 203, a memory 205, a database 207, a module 209, an audio unit 211, a transceiver 213, and an AI module 215. In an example, the memory 205, the database 207, the module 209, the audio unit 211, the transceiver 213, and the AI module 215 are coupled to the processor 203.

In an example, the processor 203 may be a single processing unit or a number of units, all of which could include multiple computing units. The processor 203 may be implemented as one or more microprocessors, microcomputers, microcontrollers, digital signal processors, central processing units, state machines, logic circuitries, and/or any devices that manipulate signals based on operational instructions. Among other capabilities, the processor 203 is configured to fetch and execute computer-readable instructions and data stored in the memory 205.

The memory 205 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

In an example, the module 209 may include a program, a subroutine, a portion of a program, a software component or a hardware component capable of performing a stated task or function. As used herein, the module 209 may be implemented on a hardware component such as a server independently of other modules, or a module can exist with other modules on the same server, or within the same program. The module 209 may be implemented on a hardware component such as processors, microprocessors, microcomputers, microcontrollers, digital signal processors, central processing units, state machines, logic circuitries, and/or any devices that manipulate signals based on operational instructions. The module 209 when executed by the processor 203 may be configured to perform any of the described functionalities.

The database 207 may be implemented with integrated hardware and software. The hardware may include a hardware disk controller with programmable search capabilities or a software system running on general-purpose hardware. The examples of database are, but not limited to, in-memory database, cloud database, distributed database, embedded database and the like. The database 207, among other things, serves as a repository for storing data processed, received, and generated by one or more of the processor 203, and module 209.

The audio unit 211 may include a speaker and/or a microphone to produce an audio output. The audio output may be implemented through a number of techniques such as Automatic Speech Recognition (ASR), Natural Language Understanding (NLU), Natural Language Processing (NLP), Natural Language Generation (NLG), or the like. The audio unit 211 may generate a text to speech operation through speaker embeddings 218 in natural language related to the IoT devices 103-1, 103-2, 103-3, and 103-4 to the user based on a receipt of command. The generation of speaker embeddings will be explained in detail in the forthcoming paragraphs.

The transceiver 213 may be a transmitter and a receiver. The transceiver 213 may communicate with the user and/or other IoT devices via any of the wireless standards, such as 3G, 4G, 5G, or the like, other wireless techniques, such as Wi-Fi, Bluetooth, etc. may also be used. The transceiver 213 may be configured to receive one or more user commands/text command/IoT events 221 or commands from other IoT devices, such as the IoT devices shown in FIG. 1.

The AI module 215 for speaker embeddings for playback to the user 218 may include a plurality of neural network layers. Examples of neural networks include, but are not limited to, convolutional neural network (CNN), deep neural network (DNN), recurrent neural network (RNN), Restricted Boltzmann Machine (RBM). The learning technique is a method for training a predetermined target device (for example, a robot) using a plurality of learning data to cause, allow, or control the target device to make a determination or prediction. Examples of learning techniques include, but are not limited to, supervised learning, unsupervised learning, semi-supervised learning, or reinforcement learning. At least one of the plurality of CNN models may be implemented to thereby achieve execution of the present subject matter's mechanism through an AI model. A function associated with AI may be performed through the non-volatile memory, the volatile memory, and the processor. The processor may include one processor or a plurality of processors. At this time, one processor or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one processor or the plurality of processors control the processing of the input data in accordance with a predefined operating rule or artificial intelligence (AI) model stored in the non-volatile memory and the volatile memory. The predefined operating rule or artificial intelligence model is provided through training or learning.

In an embodiment, the system 101 may be configured to preprocess an input natural language (NL) from a user command based on natural language processing (NLP). Thereafter, the system 101 classifies speech and non-speech information as speech information. As an example, the system 101 classifies between the command and surrounding non-speech sound in the speech sound uttered by the user. As an example, the command uttered maybe "Start Washing in Quick mode" and the non-speech information may be, for example, noisy environment, laundry scene, kitchen chimney, silent home, the sound of the television, human sound, pet sound, and the like. Thus, the classification between the command and the surrounding non speech information helps in obtaining acoustic information which thereby causes dynamically to decide the most suitable voice for the device. In particular, the system 101 may be configured to decide suitable speaker embeddings in order to generate the most suitable voice for the device. As an example, the speaker embeddings are based on a voiceprint/spectrogram with respect to the voice of a speaker/user and/or emotions exhibited during the utterance of the voice or print/spectrogram with respect to voice of a speaker/user infused with human emotions like happy, sad, anxiety, fatigue and the like. The speaker embeddings may be generated dynamically during run time and/or maybe pre-stored.

Subsequent to the classification, the system 101 may be configured to obtain an NLP result from the speech information. The NLP result may be, for example, determining at least one of success, failure, or follow-up of an IoT event on the one or more IoT devices due to the user command. As an example, success may be understood as completion of an IoT event. For example, the washing of clothes is successfully completed. Follow-up may be understood as any IoT event which needs to be follow-up. After successful completion of washing of cloths, a playing of the TV is lined up in as predefined user command. Further, the failure of an IoT event may be understood as a capability, connectivity, latency, or memory issues while executing the user command.

Thereafter, the system 101 fetches a device specific information from one or more targeted devices. Alternately, the device specific information may be obtained from the remote server/IoT cloud server 105 or the database 207. The device specific information may be associated with one or more IoT devices or network devices in an environment. The device specific information may include, for example, at least one of a device physical feature, a software feature, a device type, a device capability, a hardware feature, a device location in networked environment, usage history, a device setting, and information such as device error states, location, and device events. The device specific information may be termed as characteristics of one or more devices without deviating from the scope of the inventive concept.

As an example, the device physical feature may include a model number of the device, shape and size of the device. For example, the shape and size of the device may include, heavy device, lightweight device, medium weight device, big size device, medium size device or small size device and the like. As an example, the heavy device may include washing machines, family hubs, etc. The lightweight device may include IoT sensors, wearables, etc. The medium weight device may include a mobile, a smart speaker, etc.

A software feature may include the software version installed in the device or whether the device is automatically adaptable to update software or available software functionality, domains supported for generating voice commands and the like. Accordingly, the software feature may be utilized for determining operating states of the device, or possible error. A device type may include, for example, cleaning appliances, storage appliances, audio/video appliances, monitoring appliances, cooling appliances, static/immovable devices, movable devices and the like.

The device capability may include loading capacity or an event handling capability based on user command. For example, the loading capacity may indicate a refrigerator having a capacity of 180 litres, washing machine having a capacity of bearing 15 kg of clothes, and the like. The hardware feature may include size of the device, device capability with respect to mobility, power consumption of the device, computational speed of the device. The device location in IoT may include a geographical location of the IoT device. The usage history may include user historical data like the user's preferred mode of operation, frequency of using any IoT device, and the like. The device setting may include a particular setting of the device, for instance, a washing machine is set in heavy washing mode or an air conditioner is set for medium cooling mode and the like. Further, as an example, the device error state may include lack of water in a washing machine during cleaning or power failure during operation of the IoT device and the like. In a further example, event handling capabilities based on the user command may include, an events scenario where a user's command can be handled by a device or not. Consider a scenario when the user gives a microwave related command to a washing machine. Thus, the washing machine is not capable to handle an event which is related to the microwave. In a further example, the event handling capabilities based on user command may be related to software features. For example, if, on mobile device, some X application for playing movie/series is not installed, then any user command related to X application for playing movie/series will be out of capability for the mobile device. Further, the implementation details of the device specific information will be explained in detail in the upcoming paragraphs.

Subsequent to the fetching of the device specific information, the system 101 generates one or more contextual parameters. Alternatively, the contextual parameters may be referred to as hyper-parameters without deviating from the scope of the inventive concept. The contextual parameters may include a reduced set of parameters that are generated based on the analysis of the NLP result and the device specific information. As an example, Table 1 may represent a reduced set of parameters:

TABLE 1

| Hyper-parameters/contextual parameters: |
| --- |
| Size: Less Heavy |
| Result: Success |
| Complexity: Easy |
| Audio scene: Laundry room |
| Operating Stat: Overload |

As an exemplary scenario, the user has provided a command "Start Washing Machine in quick mode". Thus, the system 101 pre-processes the command to classify the speech and non-speech information. Thus, in this scenario, the speech information is washing clothes in quick mode and non-speech information is the acoustic information that is obtained from the non-speech information determined from audio events of the surrounding environment of the IoT devices. Thus, from the acoustic information, the system 101 identifies an audio scene. That is to say, a laundry room is being identified. Thus, the contextual parameter corresponding to the audio scene is a laundry room. Further, for example, the washing machine size is less heavy so the contextual parameter corresponding to size is less heavy. Further, if the power is in ON state, then the contextual parameter corresponding to the result may be treated as success. Since there is no other device or user is dependent on the washing machine operation, the contextual parameter corresponding to complexity is considered as easy. Further, if the clothes inside the washing machine is out of its capacity, then the contextual parameter corresponding to operating state id is overloaded. Thus, based on the device specific information and the acoustic information, a reduced set of contextual parameters is obtained as shown in Table 1.

Further, after the generation of contextual parameters and based on the contextual parameters, a suitable voice embedding from a speaker embedding is selected and the selected speaker embedding is outputted for playback to the user. In particular, the selected speaker embedding and a text are provided as an input to the text-to-speech (TTS) engine for further processing to output an audio/sound for the text in characteristics of the selected speaker embedding to play back to the user. Now, in the same example of washing machine, since the washing machine size is less heavy, and it is overloaded, a speaker embedding of a female voice with fatigue emotion is selected. The generation of speaker embedding will be explained in detail in the upcoming paragraphs.

Figure 3:
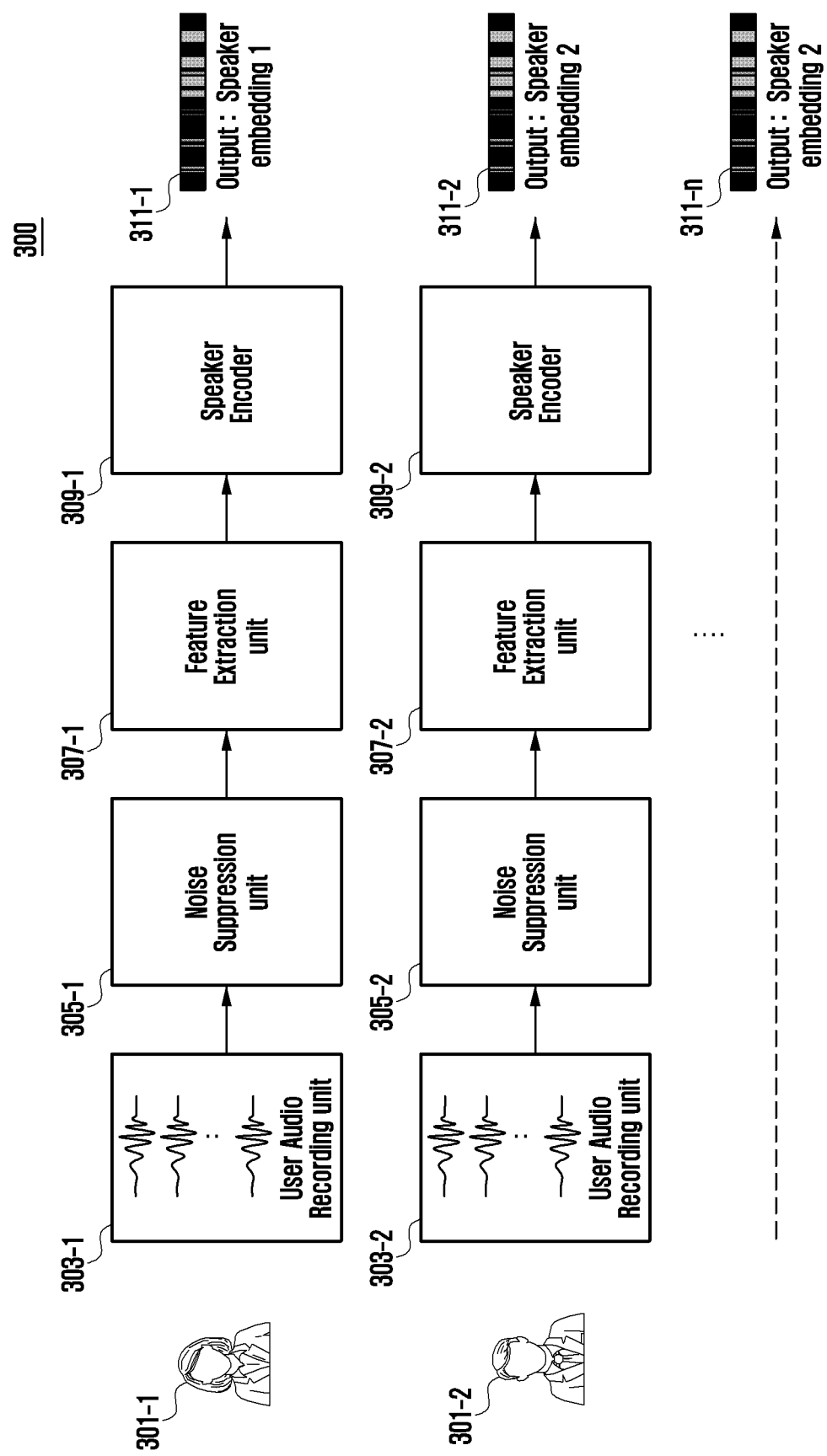
FIG. 3 illustrates a detailed implementation of components for generating speaker embeddings 300, according an embodiment of the present disclosure.

FIG. 3 illustrates a detailed implementation of components for generating speaker embeddings 300, according to an embodiment of the present disclosure. In an implementation, the system 101 includes a plurality of user audio recording units 303-1, 303-2, a plurality of noise suppression units 305-1, 305-2, a plurality of feature extraction units 307-1, 307-2, and a plurality of speaker encoders 309-1, 309-2. For instance, the system 101 may be configured to collect, by a user audio recording unit 303-1 of the plurality of user audio recording units 303-1, 303-2, a plurality of audio samples from a speaker 301-1. Thereafter, a noise suppression unit 305-1 of the plurality of noise suppression units 305-1, 305-2 may be configured to remove unwanted background noise from the collected speech. Subsequent to the removal of unwanted noise, a feature extraction unit 307-1 of the plurality of feature extraction units 307-1 and 307-2 may be configured to extract a feature of the voice as a voice print/spectrogram with respect to voice of the speaker 301-1 by applying mathematical transformation as known in the art. The extracted voice print/spectrogram represents a unique identifier of an utterance of the speaker 301-1. Thereafter, the extracted feature may be configured to provide as an input to a speaker encoder 309-1 of the plurality of speaker encoders 309-1, 309-2 to generate/output a speaker embedding 311-1. The final embedding 311-1 represents the speaker's voice. The above steps may be performed for a plurality of users 301-1, 301-2 . . . 301-$n$ to generate one or more speaker embeddings 311-1, 311-2 . . . 311-$n$. The generated one or more speaker embeddings 311-1, 311-2 . . . 311-$n$ are the encoded voice prints or speaker encoders.

Figure 4:
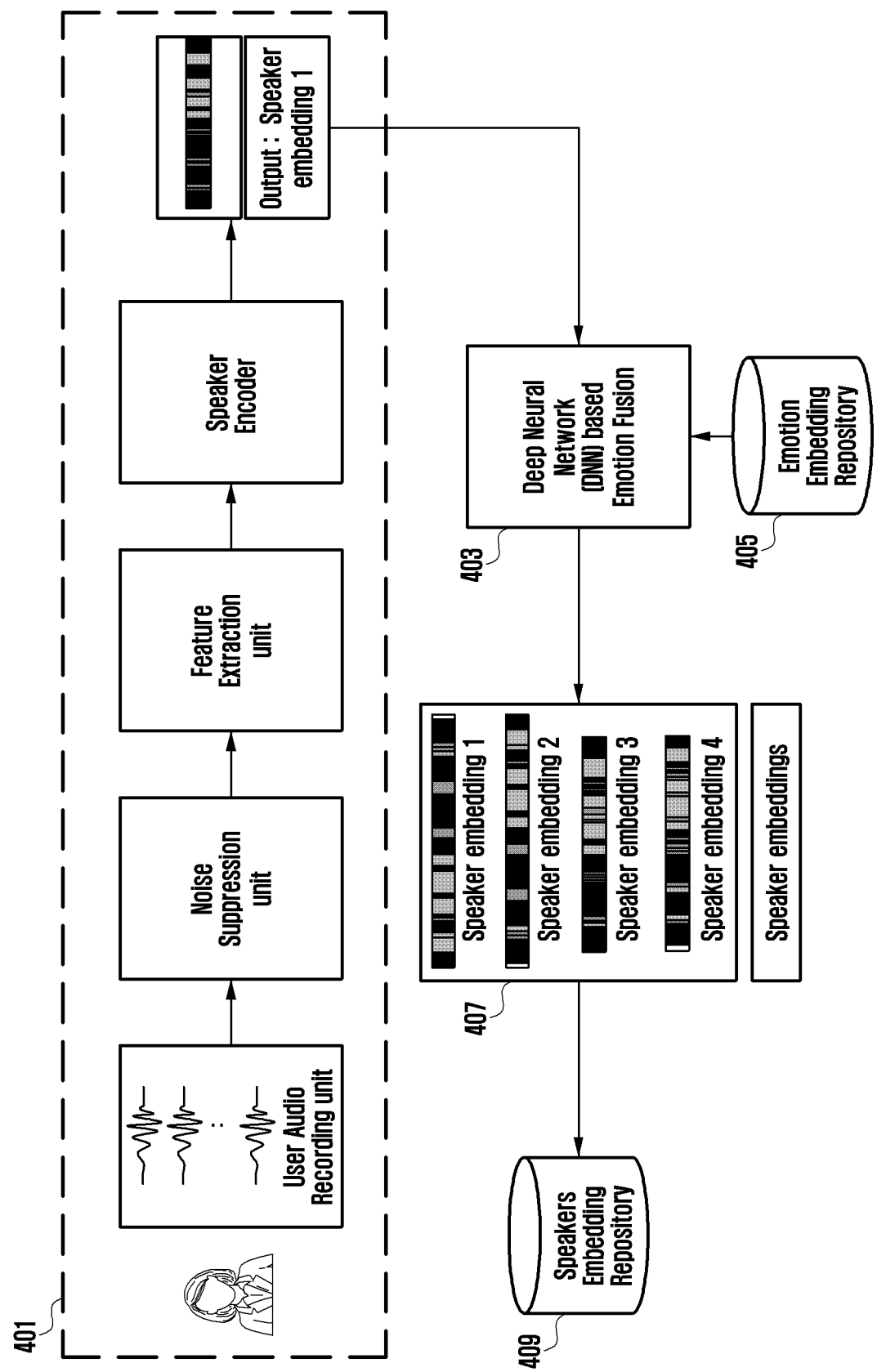
FIG. 4 illustrates a detailed implementation of components for artificially infusing human emotion into speaker embeddings, according an embodiment of the present disclosure.

Subsequent to the collection of the generation of one or more speaker embeddings, the system 101 may be configured to artificially infuse a human emotion into the generated one or more of speaker embeddings. FIG. 4 illustrates a detailed implementation of components for artificially infusing human emotion into speaker embeddings, according to an embodiment of the present disclosure. In an implementation, the block 401 is related to the generation of one or more speaker embeddings and the generation of the same has been explained in FIG. 3 above. Therefore, for the sake of brevity, the explanation for the block 401 is omitted here. Now after the generation of one or more speaker embeddings from the block 401, the generated one or more speaker embeddings may be configured to be inputted in a Deep Neural Network (DNN) 403. The generated one or more speaker embeddings may be configured to infuse with human emotion by utilizing Emotion Embedding Repository 405. The Deep Neural Network (DNN) 403 may be further configured to generate one or more emotionally infused speaker embeddings 407 including different types of voice tones and textures for the plurality of audio samples. The generated one or more emotionally infused speaker embeddings 407 are then configured to be stored or logged in the Speakers Embedding Repository 409 for selection of the speaker embeddings for the one or more target IoT devices. As an example, the generated speaker embeddings may include various types of voices from humans such as male voice, female voice, child voice, old person voice, young person voice, cartoon character voice, well know personalities voice, robotic voice, AI based generated voice and the like. In an embodiment, the speaker embeddings are one or more of the voice prints/spectrograms with respect to the voice of the speaker. As an example, the generated speaker embeddings may be termed as first speaker-embeddings without deviating from the scope of the inventive concept. As a further example, the speaker embeddings are defined in a subspace within a latent space which is limited to a defined number of coordinates.

In an alternate embodiment, the system 101 may skip the mechanism of the artificially infusion of a human emotion into the generated one or more of speaker embeddings. Thus, the generated one or more speaker embeddings may include a user natural voice without any infused emotions.

In an embodiment, the speaker embeddings are generated based on emotions exhibited during the utterance of the voice. Thus, the speaker embedding may be dynamically generated at the run-time or may be generated priorly during a training phase. These speaker embeddings, when provided to Text to Speech (TTS) engine, generate audio in the voice of the user based on the characteristics of the speaker embeddings.

Figure 5:
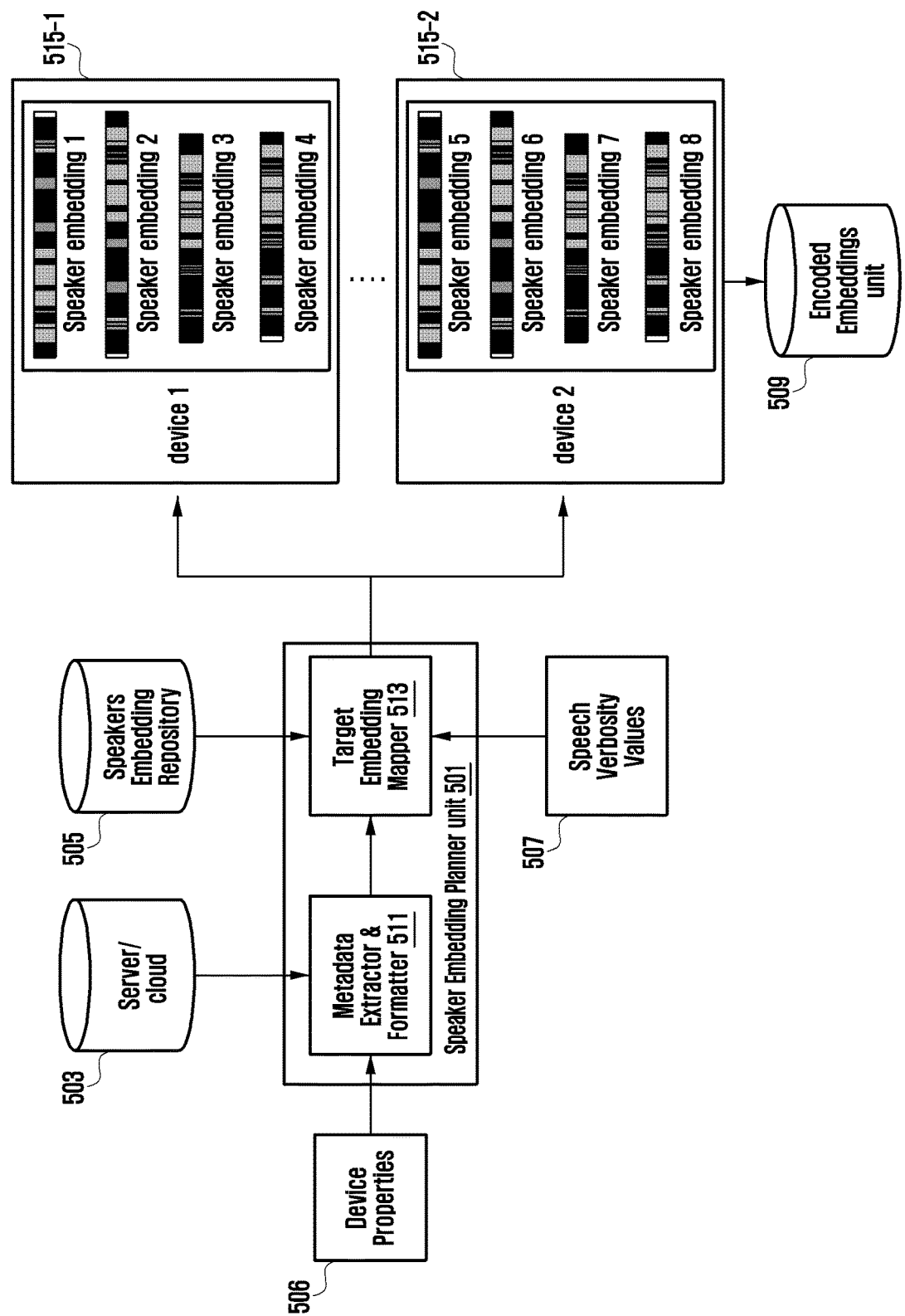
FIG. 5 illustrates a detailed implementation of components for generating a map of speaker embedding, in accordance with the present disclosure.

FIG. 5 illustrates a detailed implementation of components for generating a map of speaker embeddings, in accordance with the present disclosure. The system 101 includes a speaker embedding planner unit 501. The speaker embedding planner unit 501 generates a map of speaker embeddings with respect to the device specific information. The map of speaker embeddings is generated based on at least one of fixed or transient properties of one or more devices.

As an example, the fixed properties of the devices may include hardware features, capabilities, etc. The transient properties of the devices may include a device error state, a location, a device event, etc. The fixed properties and transient properties of the devices are together referred to as device properties 506. The device properties 506 may be provided as an input to a target audio module selector (not shown). The target audio module selector further provides the device properties 506 to a metadata extractor and formatter 511. The metadata extractor and formatter 511 may be configured to extract device specific information such as device type, device capabilities, hardware features, device locations in a home IoT setup, usage history, etc. from IoT server/IoT cloud 503. Thereafter, the metadata extractor and formatter 511 may be configured to operate upon the device properties 506 and the device specific information to output formatted metadata which act as an input to a target embedding mapper 513. The target embedding mapper 513 may also be configured to receive speech verbosity values 507 as an input.

As an example, the speech verbosity values 507 are a set of values that define an output verbosity of speaker embedding. The verbosity includes, but is not limited to, the gender of voice (male/female/kid), accent, time-stretch, pitch, length of the output (short/crisp or long/detailed), etc. These values will be used by the target embedding mapper 513 to assign an appropriate voice for target IoT device.

The target embedding mapper 513 may be configured to operate on formatted metadata, speech verbosity values 507 and speaker embedding from the repository speakers embedding repository 505. Thereafter, the target embedding mapper 513 may be configured to correlate or map the device specific information with the one or more of speaker embeddings to generate a map of a set of speaker embeddings for each of the IoT devices based on the device specific information. As an example, the blocks 515-1 and 515-2 are the maps of the IoT devices IoT device 1 and IoT device 2, respectively. The maps 515-1 and 515-2 depict all possible assigned embeddings covering voices for all possible scenarios and emotions that can happen in IOT environment. For example, the map 515-1 depicts a set of speaker embeddings that are assigned with various voices generated from the first speaker embeddings based on mapping of the extracted characteristics. For example, a speaker embedding 1 may represent a FamilyHub1_emb_sad.pkl file assigned with a sad voice, a speaker embedding 2 may represent a FamilyHub1_emb_happy.pkl and likewise. Table 2 represents the generated map of a set of speaker embeddings.

TABLE 2

| Device 1 | Speaker embedding 1 | FamilyHub1_emb_sad.pkl |
|---|---|---|
| | Speaker embedding 2 | FamilyHub1_emb_happy.pkl |
| | Speaker embedding 3 | FamilyHub1_emb_overloaded.pkl |
| | Speaker embedding 4 | FamilyHub1_emb_tired.pkl |
| Device 2 | Speaker embedding 5 | FamilyHub2_emb_sad.pkl |
| | Speaker embedding 6 | FamilyHub2_emb_happy.pkl |
| | Speaker embedding 7 | FamilyHub2_emb_overloaded.pkl |
| | Speaker embedding 8 | FamilyHub2_emb_tired.pkl |

The generation of the map of speaker embedding may be implemented in any newly added IoT device. After the generation of the map of the set of speaker embeddings, the target embedding mapper 513 may be configured to assign a distinct voice to each of the set of speaker embeddings for each of the IoT devices based on the correlation/mapping. The map of a set of speaker embeddings for each of the IoT devices will be utilized for dynamically generating natural language output. The map of a set of speaker embeddings for each of the IoT devices may be stored/logged in an encoded format in the IoT Server/IoT cloud 503 or encoded embeddings unit 509. Thus, according to the present disclosure, each of the IoT devices is assigned with unique voices. The set of speaker embeddings may be termed as second speaker-embeddings without deviating from the scope of the inventive concept.

According to an embodiment of the present disclosure, each of the speaker embeddings in the set of speaker embeddings is associated with a corresponding label. As an example, the label may correspond to an identifier of the speaker embedding. The identifier may include reference numerals, or name of the user. For example, speaker-embeddings. ram or speaker-embeddings. old man, speaker-embeddings. 1, and the like.

In another embodiment of the present disclosure, the speaker embedding planner unit 501 may be configured to identify similar IoT devices from one or more IoT devices operating in the environment based on the device specific information that includes IoT device properties 506. As an example, the speaker embedding planner unit 501 may identify IoT device 1 and IoT device 2 as similar devices or the same category devices, e.g., a refrigerator. Then, the target embedding mapper 513 may be configured to correlate/map the device specific information with the one or more of speaker embeddings to generate a map of a set of speaker embeddings for each of the identified similar IoT devices based on the device specific information. Subsequently, the target embedding mapper 513 may be configured to assign a distinct voice to each of the set of speaker embeddings for each of the IoT devices based on the correlation/mapping. As an example, the IoT device 1 is identified as the latest model of the refrigerator as compared to the IoT device 2. Then, in that case, the speaker embeddings that are assigned to the IoT device 2 will be those of an old person and speaker embeddings that are assigned to the IoT device 2 will be those of a young person. Thus, a suitable speaker embedding will be selected at a run time. Thereafter, the map of a set of speaker embeddings for each of the IoT devices may be stored in an encoded format in the IoT Server/IoT cloud 503 or an encoded embeddings unit 509. A detailed implementation of the mechanism of the system 101 to generate a speaker embedding in an interactive computing system for rendering voice assistant is explained in the forthcoming section below.

Figure 6:
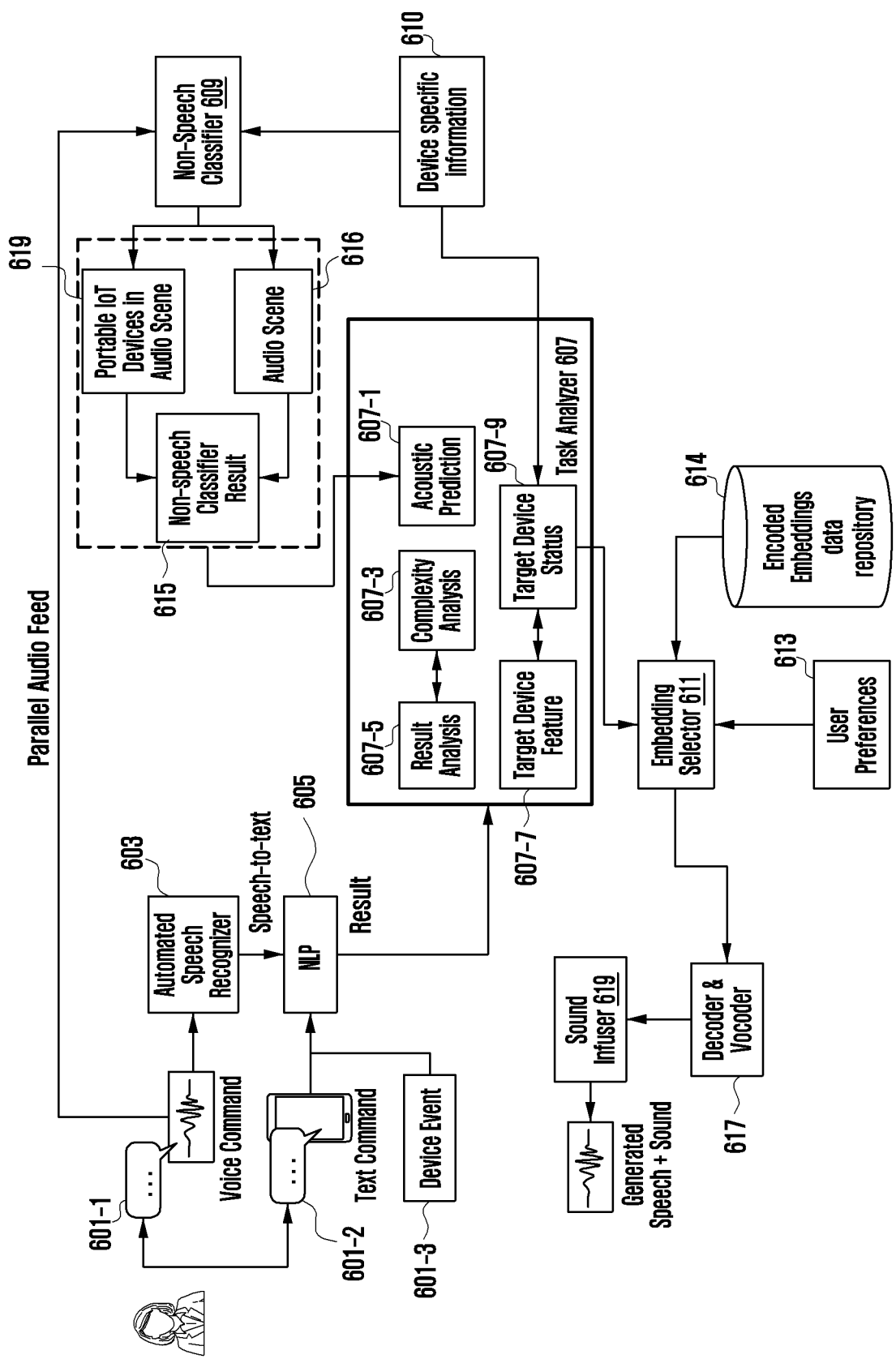
FIG. 6 illustrates a detailed implementation of components/modules for dynamically selecting speaker embeddings, in accordance with an embodiment of the present disclosure.

FIG. 6 illustrates a detailed implementation of components/modules for dynamically selecting speaker embeddings, in accordance with an embodiment of the present disclosure. In an implementation, a user may provide a voice command 601-1 or a text command 601-2. or an occurrence of a device event 601-3 is provided as an input. According to an embodiment, the automated speech recognizer 603 is configured to receive the voice command 601-1. The automated speech recognizer 603 is configured to recognize speech information of the user which is further provided as an input to NLP unit 605. Further, the NLP unit 605 may be configured to receive the text command 601-2 and the IoT event 601-3. Accordingly, the NLP unit 605 may be configured to convert the speech information, text command, or IoT event to generate an NLP result. The NLP result may be further provided to a task analyzer 607. The NLP result may be used to determine at least one of success, failure, or follow-up of an IoT event on the one or more IoT devices due to the user command. As an example, the success may be understood as the completion of an IoT event, for example, successful completion of washing of clothes. Further, the follow-up of the IoT event on the one or more IoT devices may be understood as any IoT event that required an action as a result of previous results by the user. For example, the user provides a command "call Vinay". Thereafter, analyzing the task, the system may generate an output, e.g., "Do you want to call on mobile or home number," thereafter, the user may follow up by saying "Mobile".

For example, after successful completion of washing of cloths, playing of the TV is lined up in as predefined user command. Furthermore, failure of an IoT event may be understood as a capability, connectivity, latency, or memory issues while executing the user command.

Meanwhile, the voice command 601-1 and the device specific information may be configured to feed to a non-speech classifier 609. The non-speech classifier 609 may be configured to classify the non-speech information which corresponds to the surrounding information of the IoT device or a user. In an implementation, the non-speech classifier 609 may be configured to identify, based on the voice command and the device specific information, portable IoT devices 619 in the surrounding, the audio scene 616 of the surrounding to output a non-speech classifier result 615 to the task analyzer 607 as an input for predicting a suitable audio scene.

According to an embodiment, the task analyzer 607 may include an acoustic prediction module 607-1, a complexity analysis module 607-3, a result analysis module 607-5, a target device retrieval feature module 607-7 and a target device status module 607-9. In an implementation, the task analyzer 607 may be configured to analyze the NLP result and the device specific information. A detailed implementation of the task analyzer 607 and its components are explained below.

According to a further embodiment, the acoustic prediction module 607-1 may be configured to predict an acoustic scene or audio scene of the surrounding information of the user based on the non-speech classifier result 615 that is determined by the non-speech classifier 609. As an example, the acoustic prediction module 607-1 may predict the acoustic scene or the audio scene. The acoustic scene or the audio scene may be, for example, a noisy home, silent home, alarm ringing event, a sound of a living object, or direction of the speech. As an example, the noisy home may include TV playing sound or motor running sound, tap water sound and the like. As a further example, the sound of a living object may include voice of a human or a pet and the like. Based on the acoustic scene, the audio scene may be predicted as happy, angry, or sad scene. In a further implementation, based on the acoustic scene information, the TTS output volume can be made louder. In a further implementation, the background effect can be added based on the acoustic scene information.

According to a further embodiment, the complexity analysis module 607-3 may be configured to analyze the complexity level of the user command. As an example, the complexity analysis module 607-3 may be configured to analyze whether the execution of the command is on a single device or on multiple devices, the computational overhead due to execution of the command, time taken to execute the command, and the like. Based on the analysis of the complexity analysis module 607-3 may be configured to categorize the task into easy task, normal task or hard task. For example, turning on a light may be categorized under an easy task, switching off AC at 10 p.m. may be categorized as normal task, placing an order on Amazon from shopping list may be categorized as hard task as it involves multiple steps to complete the task, hence, can be categorized as hard task.

According to another embodiment, the result analysis module 607-5 may be configured to analyze a response of IoT device. For example, the result analysis module 607-5 may be configured to analyze, based upon user command, whether an IoT device response has been successfully executed, or there is a failure in the execution of the response, or incomplete execution. If there is a failure, then analyzing a cause of the failure. For example, whether the IoT device was overloaded, there is a connectivity issue, latency issue, memory issue, and the like. Based on the analysis, the result analysis module 607-5 generates a result of the analysis. The result analysis module 607-5 may be configured to output a map of the result of analysis versus its cause.

According to another embodiment, the target device feature module 607-7 may be configured to analyze the hardware feature of the IoT device such as size, mobility, location, power consumption, computational heads, capabilities, etc. of the IoT device. The target device feature module 607-7 may be configured to analyze software features of the IoT device such as software capability, operating states, error scenarios, etc. of the IoT device. Thereafter, the target device feature module 607-7 may be further configured to categorize the IoT device such as large, small, medium, movable or non-movable based on the analysis.

According to a further embodiment, the target device status module 607-9 may be configured to obtain an IoT device current operating status with respect to is a connection, error state, overloaded, and accordingly, the IoT device is categorized.

Subsequent to the analysis of the various components of the task analyzer 607 as explained above, the task analyzer 607 may be configured to generate one or more of contextual parameters including the reduced set of parameters based on a result of the analysis of the NLP result and the analysis result of various modules of the task analyzer 607 as explained above. An example of contextual parameters is shown in Table 1.

According to a further embodiment, an embedding selector 611 may be configured to receive the generated contextual parameters from the task analyzer 607 and/or user preferences 613. For example, the user preferences are related to speech verbosity that may include at least one of gender of a voice, accent of the voice, time-stretch in a voice, length of the voice, and user's preferred voice. For example, the user has priory set the voice as a male voice. Then in that case, with respect to the example of the same washing machine as explained in the previous paragraphs, the embedding selector 611 may select speaker embedding with a male and fatigue voice instead of the female voice as explained therein.

Thereafter, the embedding selector 611 may be configured to select the most suitable speaker embedding from the encoded embedded data repository 614 for the target IoT device based on the contextual parameters and/or the user preferences 613. The speaker embedding thus selected is processed based on a text-to speech mechanism to generate text to speech (TTS) audio response to the user command. In particular, the speaker embeddings are provided to the decoder and vocoder 617 to generate a spectrogram from the speaker embeddings which then is converted to corresponding audio signal/audio sound for play back to the user in a natural language.

In a further embodiment, the embedding selector 611 may be configured to retrieve the user-preference related to speech verbosity from the device specific information. Thereafter, the embedding selector 611 may be configured to re-analyze the generated one or more contextual information. Thereafter, the embedding selector 611 may be configured to correlate the user preference related to speech verbosity with the one or more speaker embeddings to generate a modified map of the set of speaker embeddings based on the re-analyzed contextual information. The modified map of the set of speaker embeddings is then stored in a database for a selection of the speaker embeddings for the one or more target IoT devices for further use.

In an embodiment, a sound infuser 619 may be configured to receive the audio signal generated by the decoder and vocoder 617. The sound infuser 619 may be configured to select an overlay synthetic sound based on the contextual parameter, acoustic information, and the device specific information. Thereafter, the sound infuser 619 may be configured to combine the overlay synthetic sound with the generated audio sound and output in a natural language the audio sound infused with overlay synthetic sound to generate voice stream to playback to the user. As an example, to notify error state, beep signals can be overlaid, and to notify security alarms, siren signals can be overlaid, etc. The infusion of the overlaid sound is optional. Thus, the audio signal outputted by the decoder and vocoder 617 may be played as TTS by the voice assistant device.

Figure 7:
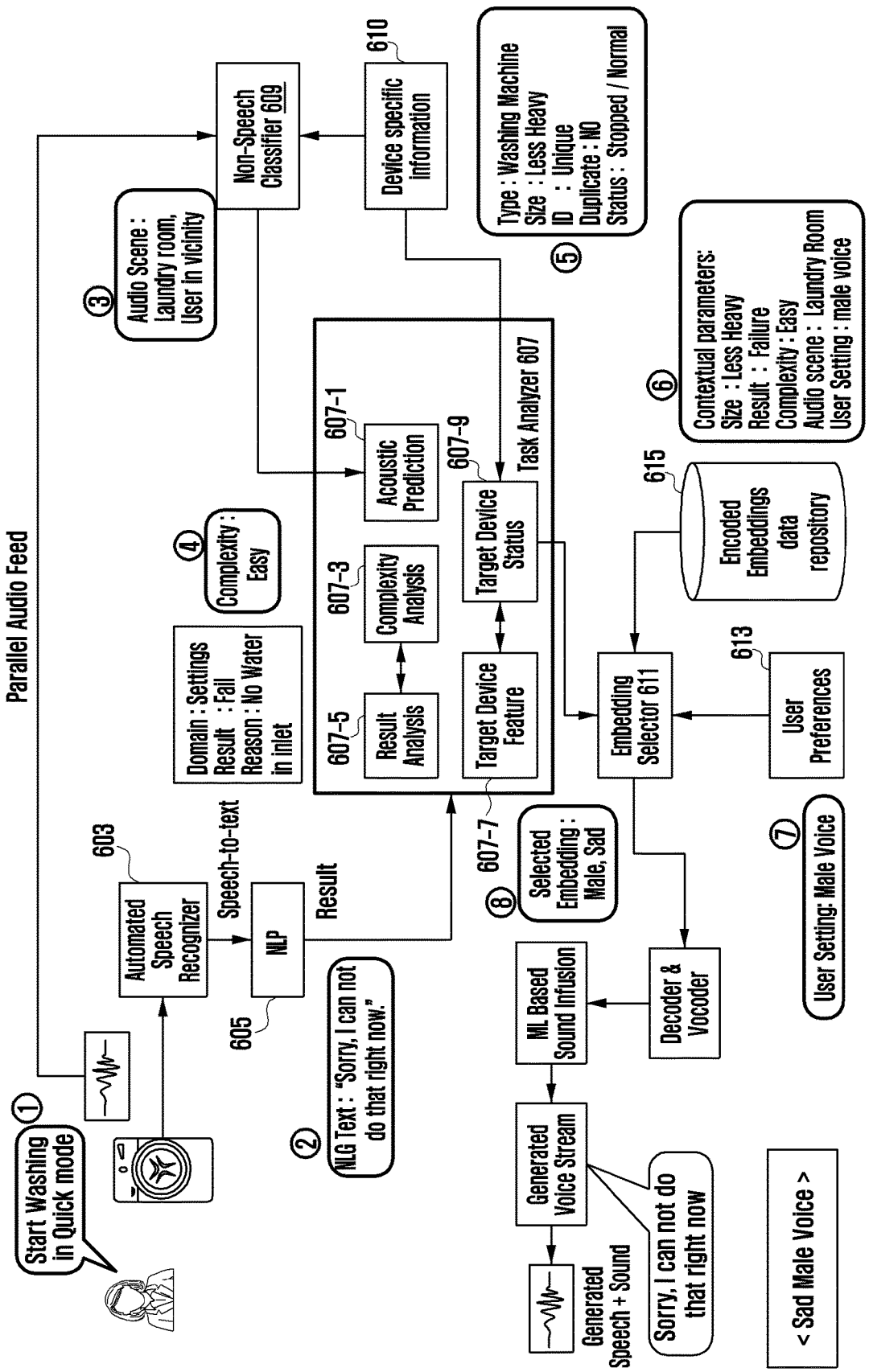
FIG. 7 illustrates an exemplary scenario in an interactive computing system for rendering voice assistance, in accordance with an embodiment of the present disclosure.

FIG. 7 illustrates an exemplary scenario in an interactive computing system for rendering voice assistance, in accordance with an embodiment of the present disclosure. The exemplary scenario implements the details of FIG. 6 therefore for the sake of simplicity same reference numerals have been used. In a scenario, user has provided a command "Start Washing Machine in quick mode" depicted in block 1. Thus, the system 101 pre-processes the command to classify the speech and non-speech information. The NLP unit 605 generates the NLP result as "Sorry, I cannot do that right now" depicted in block 2. Meanwhile, the non-speech classifier 609 identifies the audio scene as a laundry room and user is in the vicinity, as depicted in block 3. The result analysis unit 607-5 generates its analysis result: as "fail", reason: as "No water in the inlet" and the complexity analysis module 607-3 generates its analysis result as complexity: easy depicted in block 4. Further, the device specific information 610 may determine the device specific information as Type: washing machine, size: less heavy, ID: unique, duplicate: No, status: stopped/normal, as depicted in block 5. Thereafter, the task analyzer 607 may generate contextual parameters as depicted in block 6. As can be seen, the contextual parameters are a reduced set of parameters. Based on this contextual parameters and user preference, the embedding selector 611 selects a most suitable speaker embedding as depicted in block 8.

Figure 8:
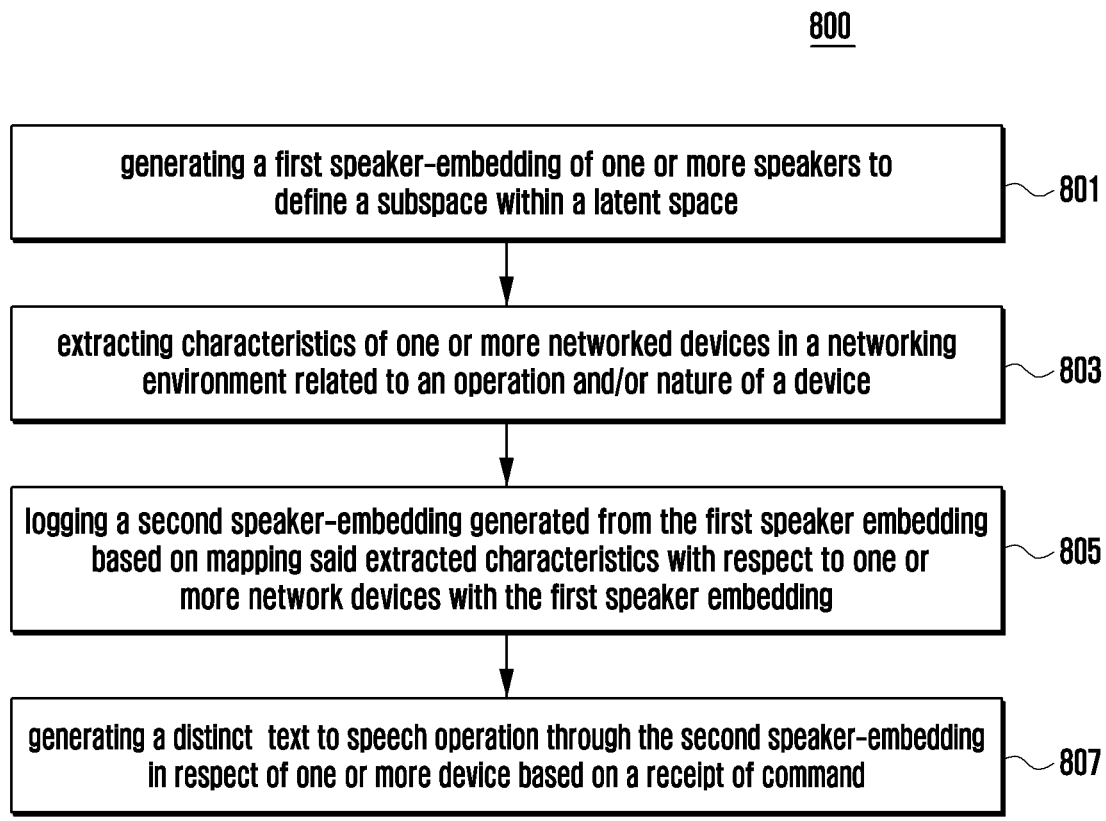
FIG. 8 illustrates a flow diagram for an interactive computing system for rendering voice assistance, in accordance with an embodiment of the present disclosure.

FIG. 8 illustrates a flow diagram for an interactive computing system for rendering voice assistance, in accordance with an embodiment of the present disclosure. The method 800 may be implemented by the system 101 using components thereof, as described above. In an embodiment, the method 800 may be executed by the processor 203, the memory 205, the database 207, the module 209, the audio unit 210, the transceiver 213, the AI module 215, and the audio unit 211. Further, for the sake of brevity, details of the present disclosure that are explained in detail in the description of FIG. 1-FIG. 6, and therefore not disclosed herein. Further, FIG. 8 will be illustrated by referring to FIG. 9.

Figure 9:
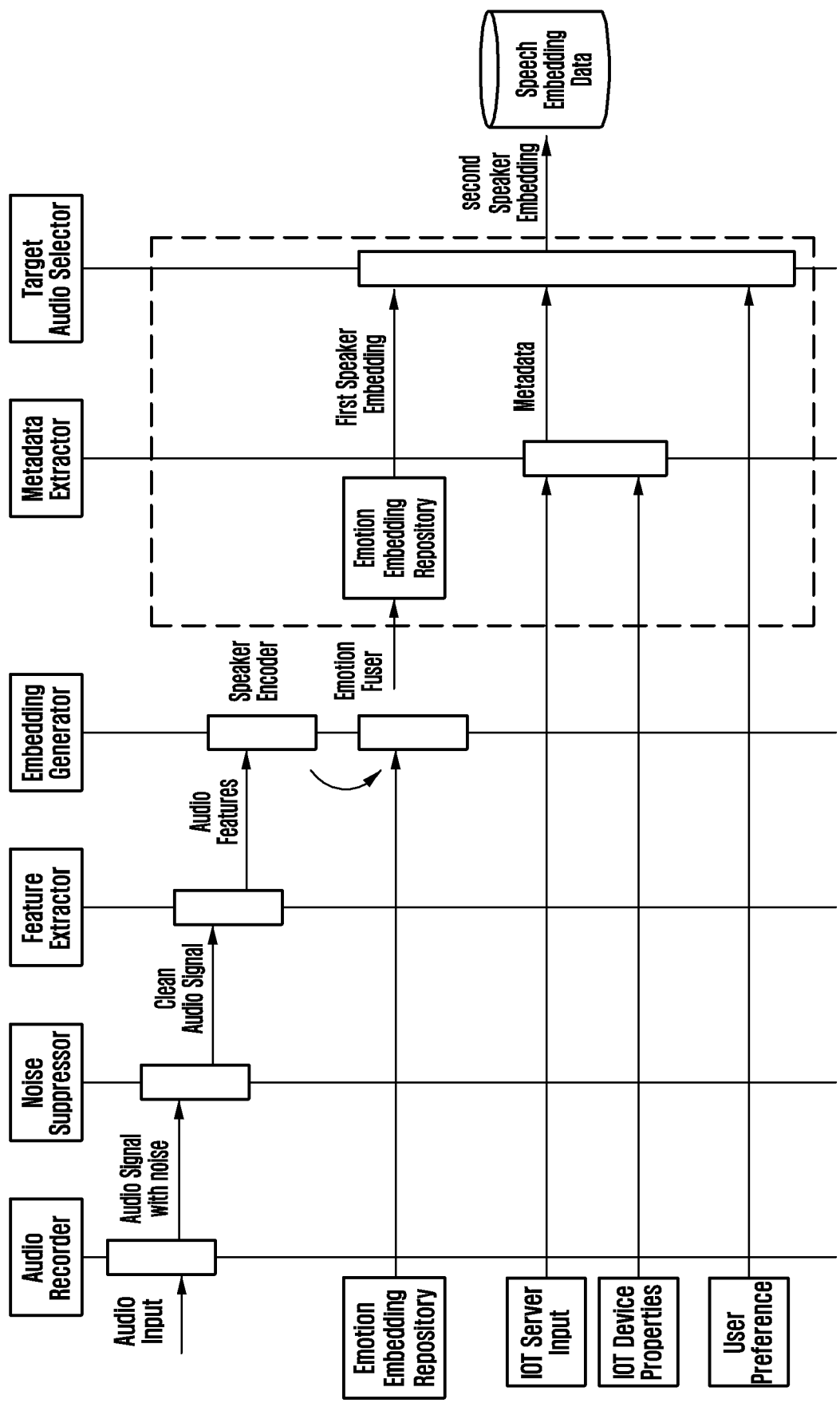
FIG. 9 illustrates a sequence flow for an interactive computing system for rendering voice assistance, in accordance with an embodiment of the present disclosure.

At block 801, the method 800 includes generating a first speaker-embedding for one or more speakers to define a subspace within a latent space. As shown in FIG. 9 when an audio input is received by the audio recorder, the audio signal usually includes noise and thus the audio signal is referred to as "audio signal with noise". The noise suppressor cleans the noise and outputs a clean audio signal referred to as "clean audio signal". A feature extractor extracts the audio features and generates a speaker encoder which is then infused with emotion to generate a first speaker embedding. The first speaker embedding is stored in the speaker embedding repository. The same process is performed for one or more speakers. A detailed description of generation of the first speaker embedding is described in FIG. 3. Therefore, for the sake of brevity, it has not been disclosed here.

At block 803, the method 800 includes extracting characteristics of one or more networked devices in a networking environment related to an operation and/or nature of a device. As shown in FIG. 9, the metadata extractor extracts the metadata from IoT server input, IoT device properties and provide this metadata to the target audio selector.

At block 805, the method 800 includes logging a second speaker-embedding based on mapping the extracted characteristics with respect to one or more network devices. As shown in FIG. 9, the target audio selector correlates extracted characteristics of the metadata to generate the second speaker-embedding which is stored in the speech embedding data for selection of suitable speaker embedding for generating TTS response to playback to the user.

At block 807, the method 800 includes generating text to speech operation through the second speaker-embedding in respect of one or more device based on a receipt of command.

As a further example, the method 800 further includes selecting a distinct voice for one or more networked devices based on the mapping between the device characteristics and a label associated with logged second speaker embedding during the text to speech operation. Then the method further assigns the distinct human voice with respect to the one or more networked devices during the text to speech operation.

Figure 10:
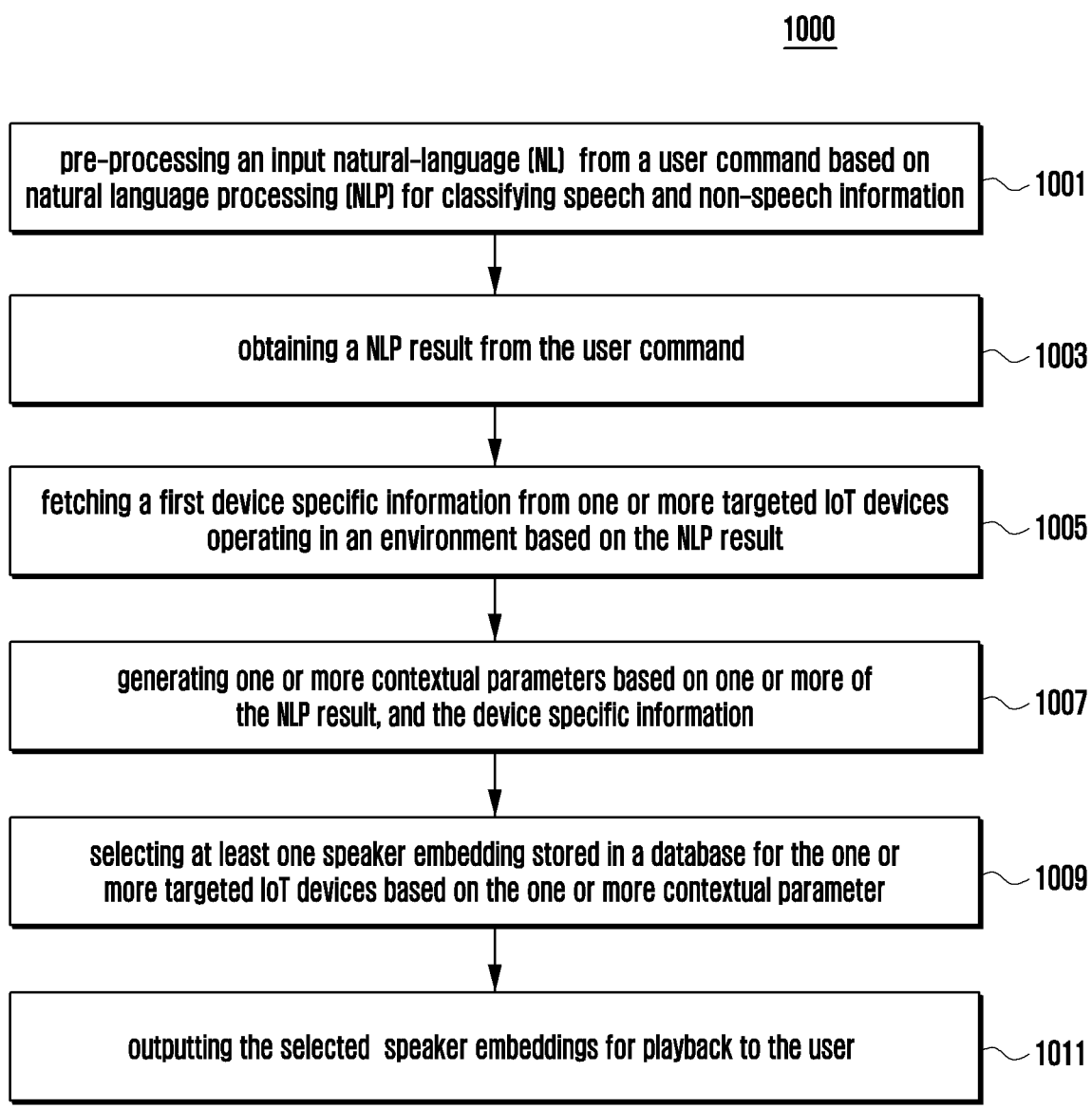
FIG. 10 illustrates a flow diagram of a system for rendering voice assistance, in accordance with an embodiment of the present disclosure.

FIG. 10 illustrates a flow diagram for an interactive computing system for rendering voice assistance, in accordance with an embodiment of the present disclosure. The method 1000 may be implemented by the system 101 using components thereof, as described above. In an embodiment, the method 1000 may be executed by the processor 203, the memory 205, the database 207, the module 209, the audio unit 210, the transceiver 213, the AI module 215, and the audio unit 211. Further, for the sake of brevity, details of the present disclosure that are explained in detail in the description of FIG. 1-FIG. 6, and therefore not disclosed herein. Further, FIG. 10 will be illustrated by referring to FIG. 11.

At block 1001, the method 1000 includes pre-processing an input natural-language (NL) text from a user command based on natural language processing (NLP) for classifying speech and non-speech information. As can be seen in the FIG. 11, the automated speech recognition classifies the voice command as audio-1 as non-speech information and audio-2 as speech information performing the steps at block 1001.

Further, the pre-processing step of method 1000 includes collecting a plurality of audio samples from a plurality of speakers to generate one or more speaker embeddings. Then, the pre-processing step includes storing the generated one or more speaker embeddings with human emotions in the database for selection of the speaker embeddings for the one or more target IoT devices. Further, the pre-processing step includes extracting a device specific information for one or more IoT devices operating in a networking environment. Thereafter, the pre-processing step includes correlating the second device specific information with the one or more of speaker embeddings to generate a map of a set of speaker embeddings for each of the IoT devices based on the device specific information. Then, the pre-processing step includes assigning a distinct voice to each of the set of speaker embeddings for each of the IoT devices based on the correlation and storing the assigned set of speaker embeddings into the database as the map for selection of the encoded speaker embeddings for the one or more target IoT devices.

In a further example, the method 1000 further include artificially infusing a human emotion into the generated one or more of speaker embeddings, wherein the generated one or more speaker embeddings includes different types of voice tones and textures for the plurality of audio samples and storing the generated one or more speaker embeddings with human emotions in the database.

In a further example, the pre-processing step of method 1000 includes extracting a device specific information for one or more IoT devices operating in a networking environment and then identifying similar IoT devices from one or more IoT devices operating in the environment based on the device specific information. Thereafter, the pre-processing step includes correlating the device specific information with the one or more of speaker embeddings to generate a map of a set of speaker embeddings for each of the identified similar IoT devices based on the device specific information. Then, the pre-processing step includes assigning a distinct voice to each of the identified similar IoT devices from the set of speaker embeddings and storing the assigned set of speaker embeddings into the database as the map for selection of the speaker embeddings for the one or more target IoT devices.

At block 1003, the method 1000 includes obtaining an NLP result from the user command. As can be seen in the FIG. 11, the task analyzer obtains the speech information. As an example, the obtaining step comprises obtaining acoustic information forming a part of non-speech information to cause generation of the contextual parameters based on the acoustic information. Further, the obtaining of the NLP result from the speech information in NL text comprises determining one of success, failure, or follow-up of an IoT event on the one or more IoT devices due to the user command or device specific events, wherein a result of determination corresponds to the NLP result. Further, the obtaining of the acoustic information from the non-speech information in the input NL text comprises: determining one or more audio events of the surrounding environment of the one or more targeted IoT devices, wherein the audio events of the surrounding environment correspond to acoustic information.

At block 1005, the method 1000 includes fetching device specific information from one or more targeted IoT devices operating in an environment based on the NLP result. As an example, the device specific information is associated with one or more IoT devices comprising at least one of a device physical feature, a software feature, a device type, a device capability, a hardware feature, a device location in IoT environment, usage history, a device setting, and information such as device error states, location, and device events. As can be seen from FIG. 11, the fetching of the device specific information includes fetching of data about active devices, and target device characteristics.

Figure 11:
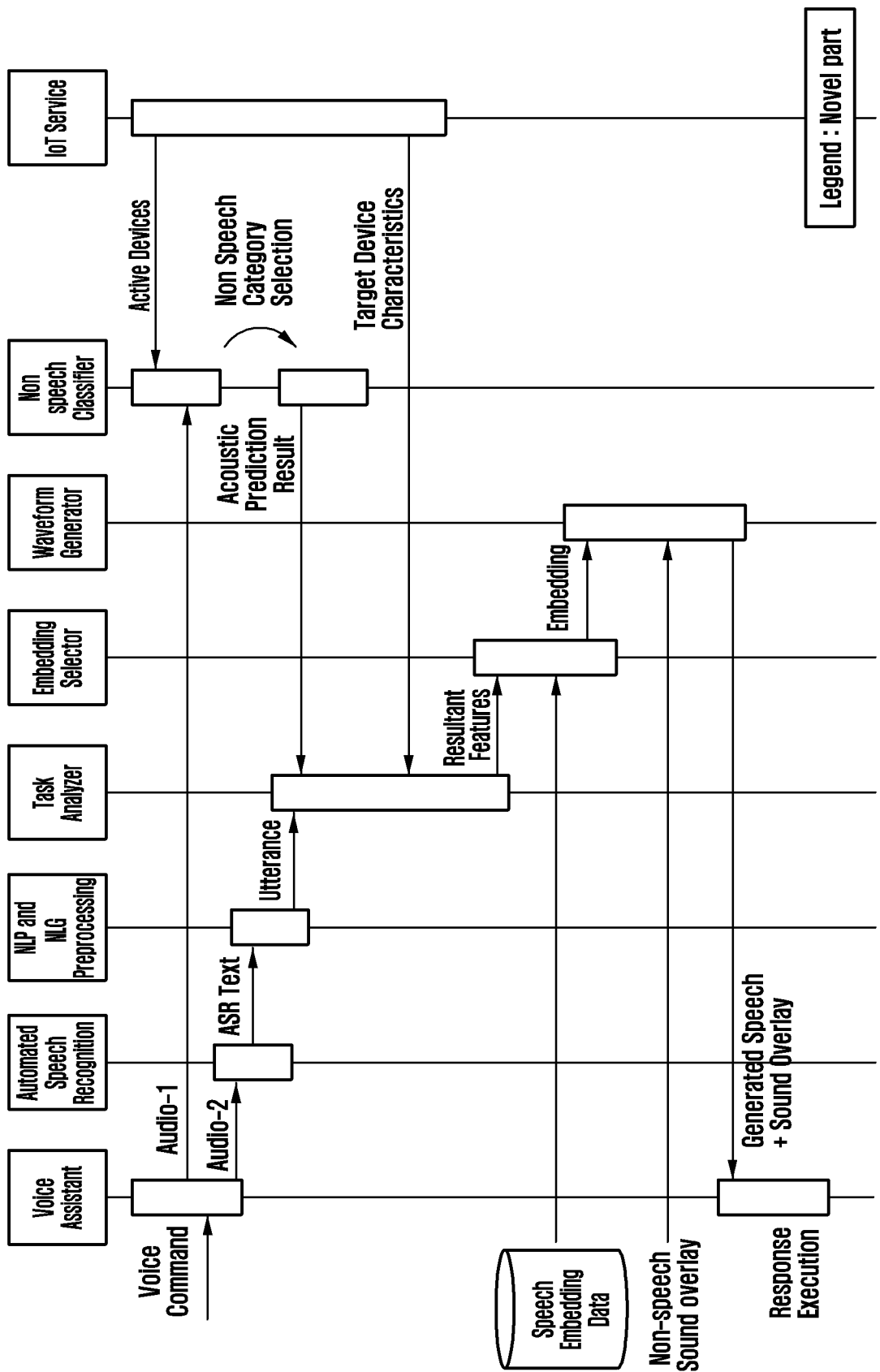
FIG. 11 illustrates a sequence flow of a system for rendering voice assistance, in accordance with an embodiment of the present disclosure.

At block 1007, the method 1000 includes generating one or more contextual parameters based on one or more of the NLP result, and the device specific information. As can be seen from FIG. 11, the task analyzer generates a resultant feature which is referred to as contextual parameters in the method performed by block 1007. The generation of one or more of contextual parameters comprises selecting a voice embedding from the speaker embedding for playback by an IoT device. As can be seen in FIG. 11, the embedded selector selects embeddings for generating waveform thus performing the step at block 1007.

At block 1009, the method 1000 includes selecting at least one speaker embedding stored in a database for the one or more targeted IoT devices based on the one or more contextual parameters. As can be seen in FIG. 11, the selection of the speaker embeddings is performed for a database referred to as speech embeddings data.

At block 1011, the method 1000 includes outputting the selected speaker embeddings for playback to the user. Further, the speaker embeddings are dynamically generated as a natural language output. As can be seen from the FIG. 11, the embedded selector selects embeddings from the speech embeddings data for selecting speaker embeddings and generates a response for execution by the waveform generator.

In a further example, the method 1000 further includes analyzing the NLP result and the device specific information, wherein the one or more of contextual parameters comprise a reduced set of parameters that are generated based on the analysis of the NLP result and the device specific information. The analyzing of the NLP result and the device specific information is performed by the task analyzer shown in FIG. 11.

In another example, the method 1000 further includes retrieving a user-preference related to speech verbosity from the device specific information and then re-analyzing the generated one or more contextual information. Thereafter, the method 100 includes correlating the user preference related to speech verbosity with the one or more speaker embeddings to generate a modified map of the set of speaker embeddings based on the re-analyzed contextual information, wherein the speech verbosity includes at least one of gender of a voice, accent of the voice, time-stretch in a voice, length of the voice, and user's preferred voice and the method includes storing the modified map of the set of speaker embeddings for selection of the speaker embeddings for the one or more target IoT devices.

In yet another example, the method 1000 further includes generating an audio sound based on processing of the selected speaker embeddings by utilizing text to speech mechanism and then selecting an overlay synthetic sound based on the contextual parameter, an acoustic information and the device specific information and then combining the overlay synthetic sound with the generated audio sound. Thereafter, the method further includes outputting in a natural language the audio sound infused with overlay synthetic sound to playback to the user. As can be seen from FIG. 11, a non-speech sound overlay may be infused by the waveform generator and may be output as a generated speech with sound overlay.

Figure 12:
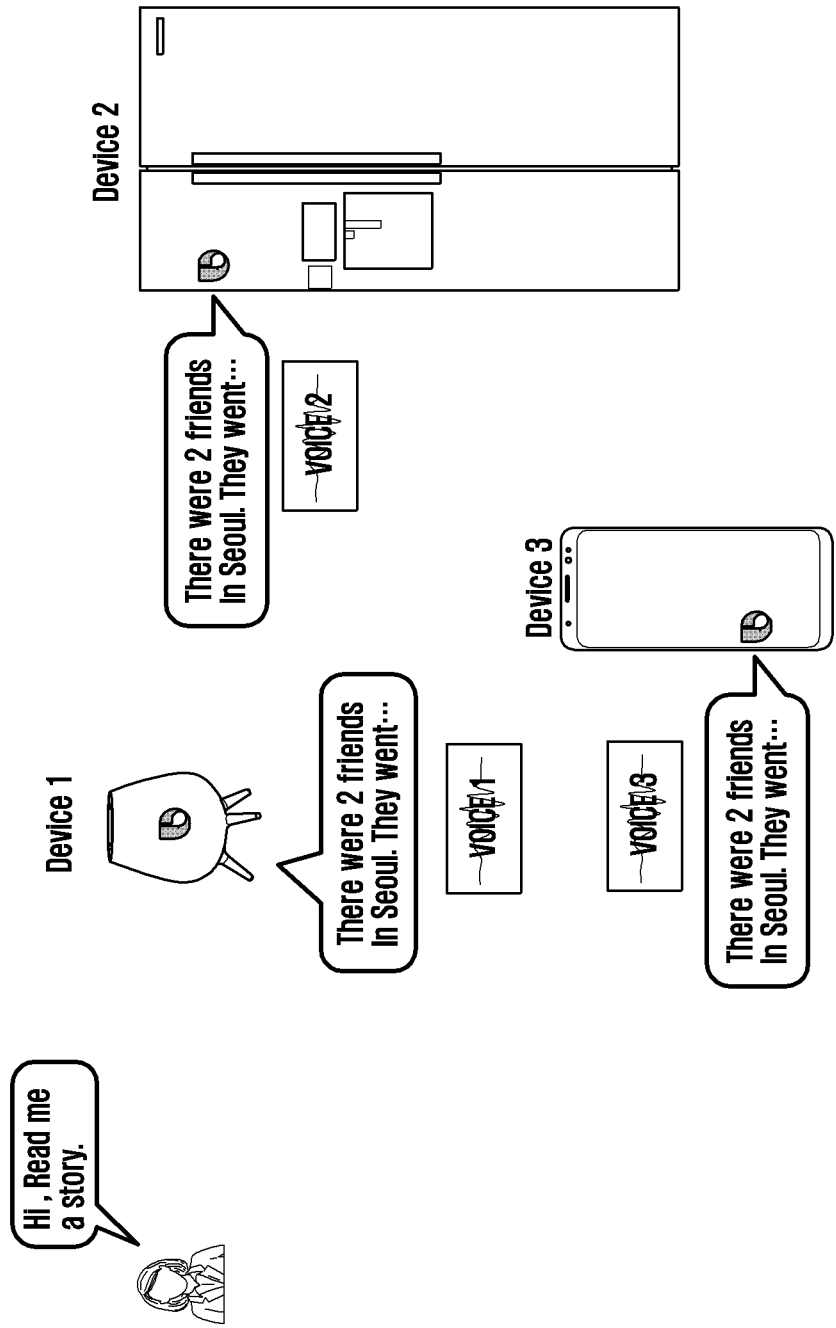
FIG. 12-18 illustrate various use cases based on the implementation of the system, in accordance with an embodiment of the present disclosure.

In yet another example, the method 1000 further comprises processing the selected speaker embeddings based on a text to speech mechanism to playback in a natural language to the user. In an exemplary scenario, the system 101 may be capable to generate audio signal for playback to the user based on various device physical features. For example, heavy devices such as washing machine, family hub, etc. may be configured to generate a thicker voice. The lightweight devices such as IoT sensors, wearables, etc. may be configured to generate lighter voice. Likewise, the medium devices such as mobiles, smart speakers may be configured to generate medium voice. In an alternate implementation, the generated audio signals may be stored priorly so that even if the device is in offline mode, the device is capable to generate unique or distinct voice based on the assigned distinct voice to each of the devices. FIG. 12 illustrates an exemplary scenario for generating distinct voices for different devices based on the device physical properties. For example, voice 1 may be assigned to device 1 which falls in the lightweight category, voice 2 may be assigned to device 2 which falls in the heavy weight category, and voice 3 may be assigned to device 3 which falls in the medium weight category.

In a further exemplary scenario, the system 101 may be capable to generate audio signal for playback to the user based on device usage duration and age of the device. For example, if devices are getting old, then the assigned voice will be similar as that of old version of an old person and the like. In another example, if the system identifies two similar devices, then two distinct voices will be assigned to the devices based on the time it was brought, device location in networked IoT environment, device physical features, software features, device types, device capabilities, hardware features.

Figure 13:
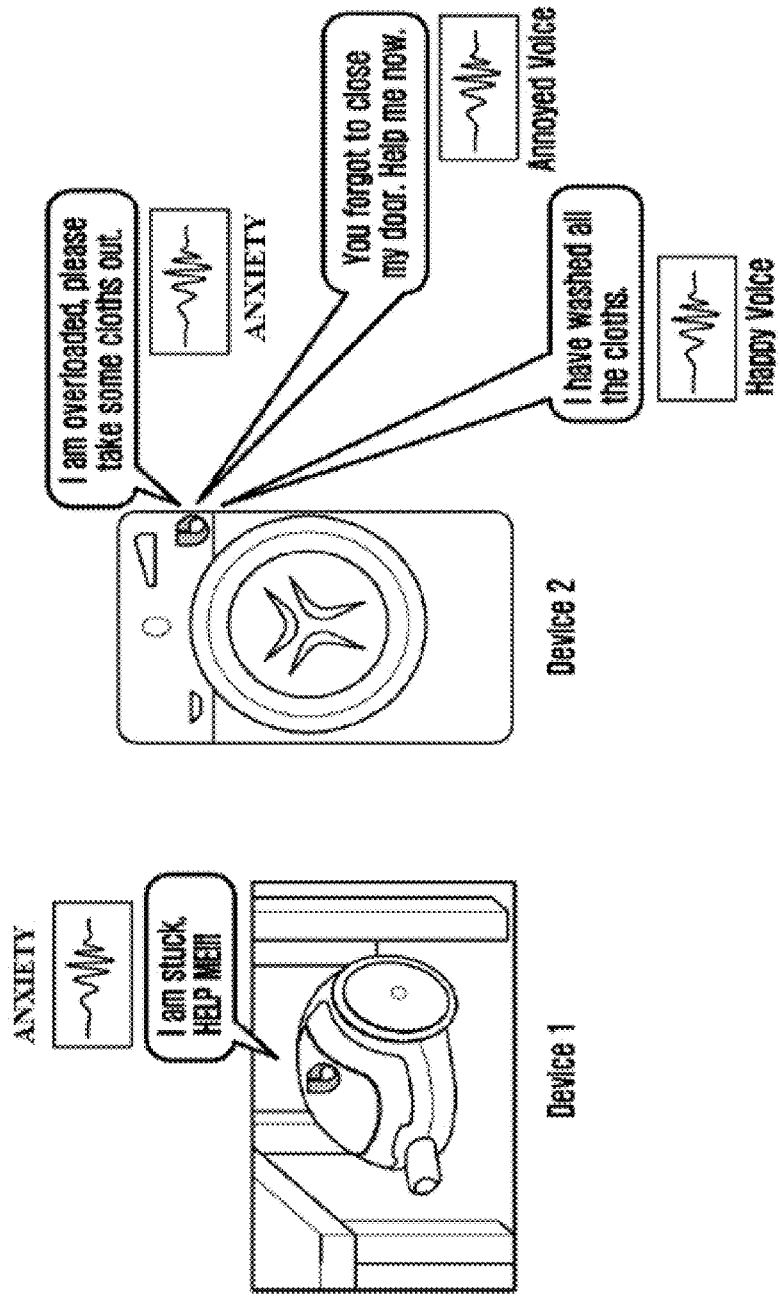

In yet further exemplary scenario, FIG. 13 illustrates that the system 101 may be capable to generate audio signal for playback to the user based on the device capabilities. For example, a device 1 may get stuck while performing an operation, then the device 1 may generate a response "I am stuck, Help Me !!!" in an anxiety voice when the device capabilities correspond to operation issues. Likewise, for example, a device 2 may be overloaded while performing an operation, then the device 2 may generate a response "I am overloaded, please take some cloths out" in a fatigue voice when the device capabilities correspond to a capacity. In a further example, when the device capabilities correspond to an error event or completion of an event, then the device 1 may generate a response "You forgot to close my door. Help me now." in an annoyed voice or "I have washed all the cloths," respectively.

Figure 14:
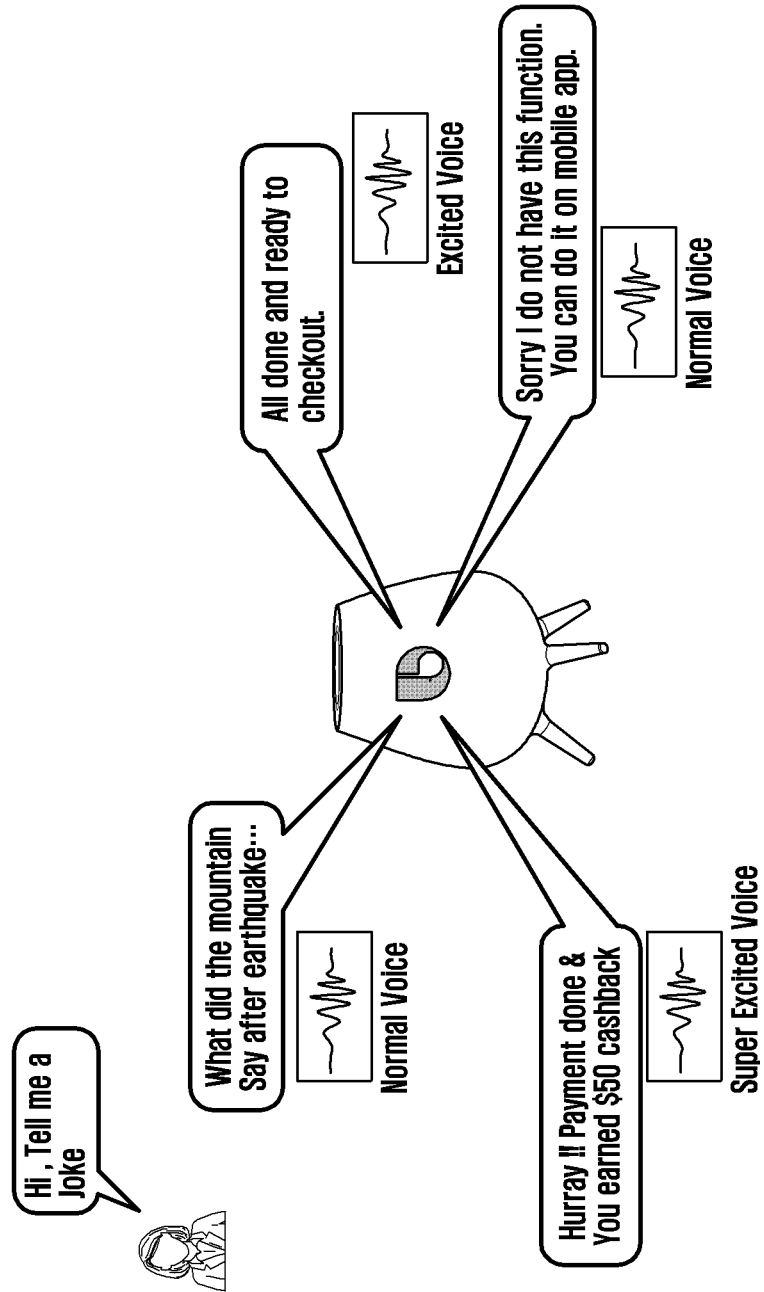

According to a further example, the system 101 may be capable to generate audio signal for playback to the user based on task complexity. For example, if a device completes a difficult task, its voice will have happiness having a sense of achievement. The user can feel the complexity of tasks. Difficult/complex tasks can be performed over multiple devices. 3rd party vendor communication tasks which need urgency, such as order online on black Friday sale, can be reacted by the voice assistant in similar tone. If the device could not complete a task due to its limitation, then there will a sense of sadness in voice. If the device can not complete a task, but can suggest user an alternate option, then voice texture will be different as depicted in FIG. 14.

Figure 15:
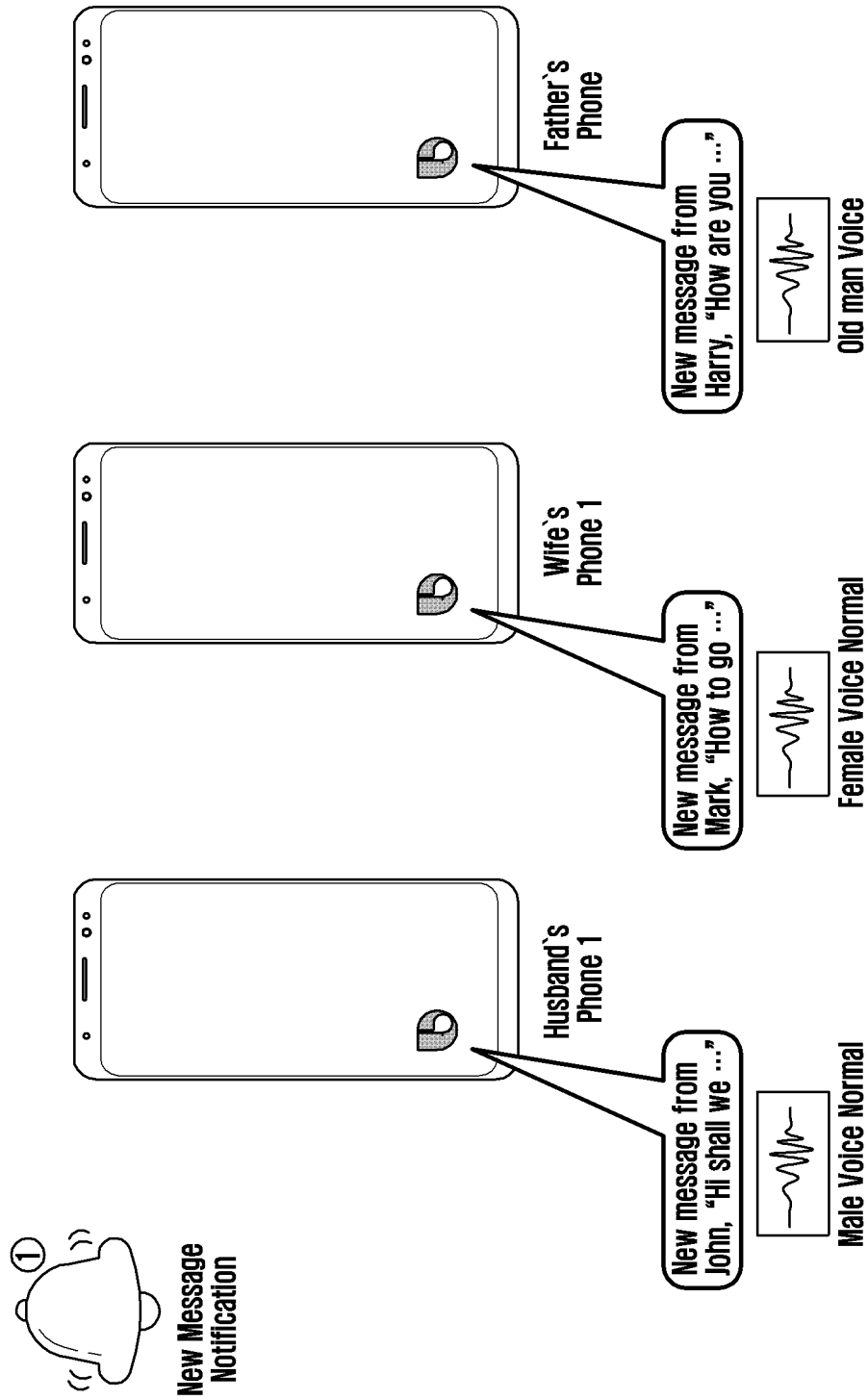

According to a further example, the system 101 may be capable to generate multiple audio signals for playback to the user having similar devices based on device and user profile features as depicted in FIG. 15. For example, the husband's phone will generate a notification in a male voice or wife's phone will generate a notification in a female voice or father's phone will generate a notification in an old man voice.

Figure 16:
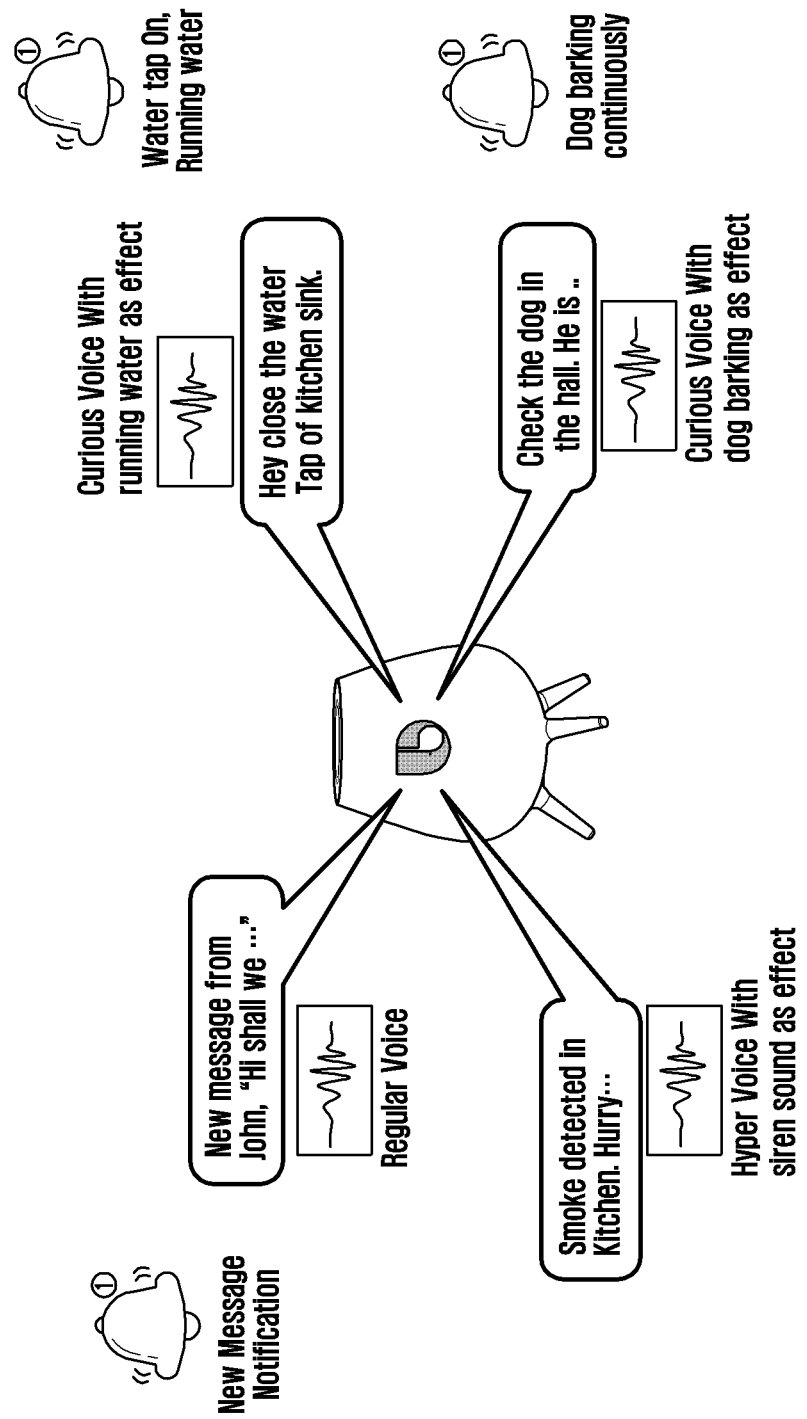

According to a further example, the system 101 may be capable to generate audio signal for playback to the user when the same type of multiple devices is present in a home. For example, a smart TV in a living room may generate a voice signal which is distinct from the smart TV in a kitchen room. In a further example, the system 101 may be capable to generate audio signal for playback to the user for different IoT event based trigger. For example, as illustrated in FIG. 16, the system 101 may generate a voice in a regular voice in case a notification is received or generate a voice in a curious voice with running water as effect in case a notification is received for water tap on or generate a voice in a curious voice with dog barking as effect in case notification is received for dog barking or generate a voice in a hyper voice with siren sound as effect in a case security alarm for detecting a smoke is being received.

Figure 17:
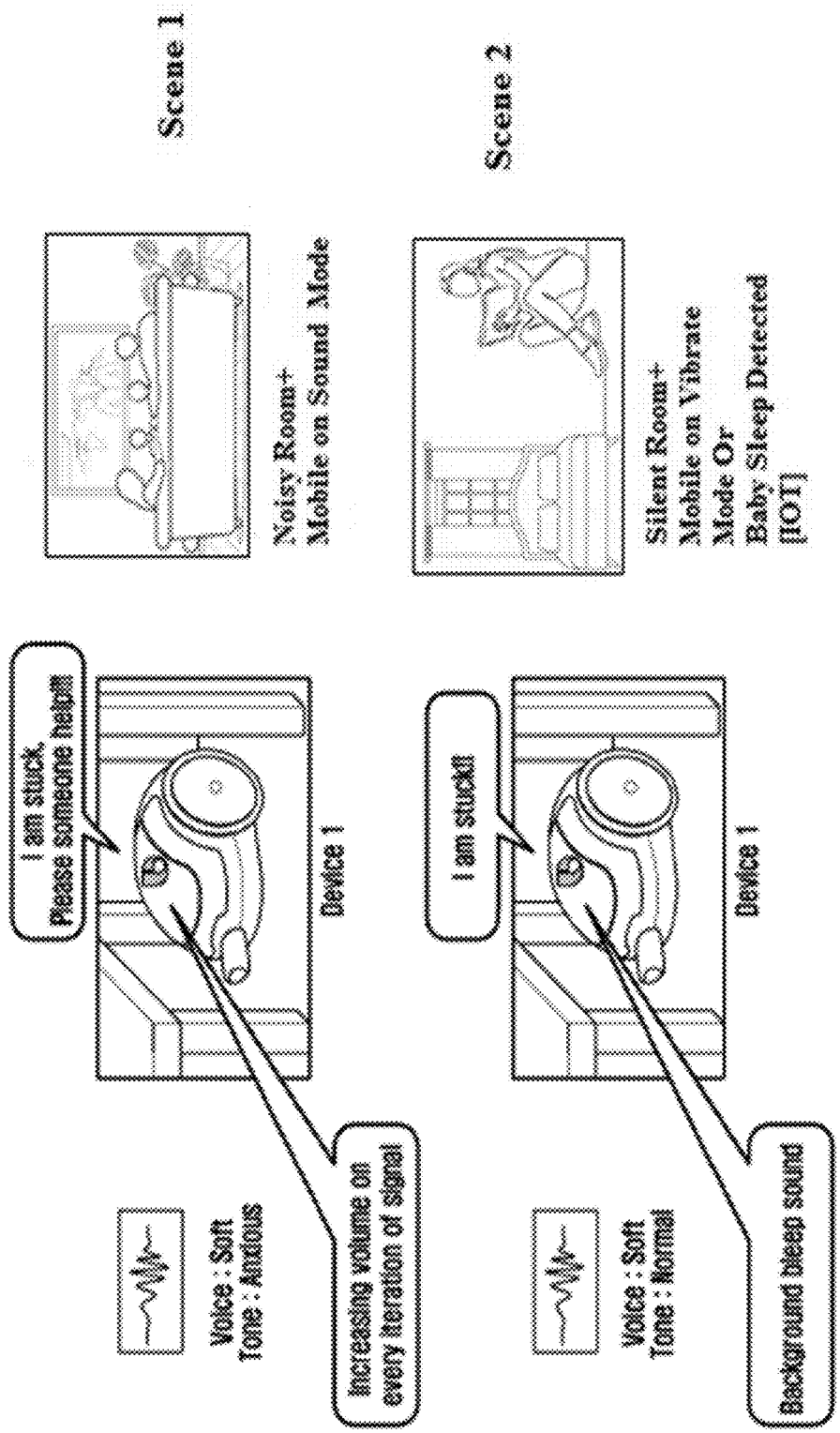

According to another example, referring to FIG. 17, the system 101 may be capable of generating voice signals based on acoustic scene and device setting and modifying tone of the output generated voice. As can be seen in scene 1, if the acoustic scene is identified as a noisy room and a mobile on sound mode then the voice generated by the device will be modified with each iteration signal. In a further scene 2, if the acoustic scene is identified as a silent room, the mobile on vibrate mode or baby sleep detected (IOT), then the voice generated by the device will be a in background bleep sound.

According to yet another exemplary scenario, based on vicinity to user, a device can relay a message based on user distance and noise level, for example, in an error event of a washing machine, the device can relay a message of washing machine in the machine's voice to the user when the user is at a distance. This will make sure that the user gets the message and from voice he/she can identify which device the message actually came from.

Figure 18:
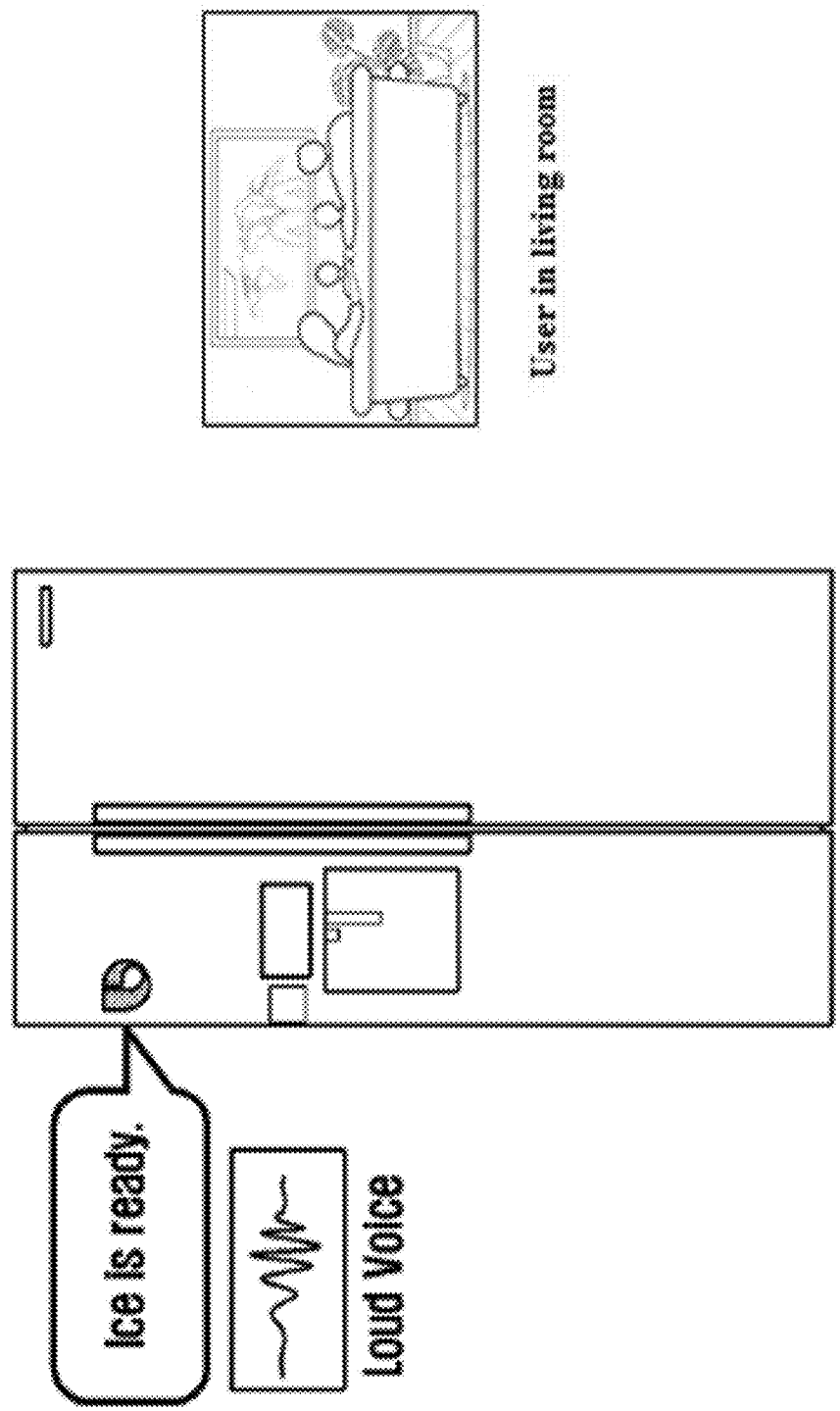

According to yet another exemplary scenario, the system 101 may be capable of volume adjustment of the voice signal based on a type of an event and the user's presence detection as illustrated in FIG. 18. Thus, as can be seen when the user presence is detected in a living room, the device 1 will generate the voice signal in loud voice. Thus, from the above it can be gathered that disclosure improves end-user experience and increases user connection with AI enabled virtual assistant systems.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

What is claimed is:

1. A method in an interactive computing system, the method comprising:
    receiving an audio input including a user command of a user and a sound from an environment in which one or more IoT devices operate, the user command including a task and information on a target IoT device for performing the task among the one or more IoT devices;
    classifying the audio input into speech information and non-speech information, wherein the non-speech information corresponds to the sound from the environment in which the one or more IoT devices operate;
    receiving information of an event on the target IoT device;
    performing natural language processing (NLP) on the speech information and the information of the event on the target IoT device to obtain a result of the NLP;
    fetching a device specific information of the target IoT device from the target IoT device among the one or more IoT devices operating in the environment based on the result of the NLP;
    analyzing the result of the NLP;
    generating one or more contextual parameters based on the non-speech information, the device specific information of the target IoT device and the analyzed result of the NLP;
    selecting at least one speaker embedding stored in a database for the one or more IoT devices based on the one or more contextual parameters;
    outputting the selected at least one speaker embedding for playback to the user; and
    processing the selected at least one speaker embedding based on a text to speech mechanism to playback in a natural language to the user, wherein the one or more contextual parameters include:
  a size of the target IoT device,
  a complexity determined based on dependency of another IoT device of the one or more IoT devices on an operation of the target IoT device,
  an audio scene indicating a location in which the target IoT device operates, and
  an operating state of the target IoT device,
wherein the selecting of the at least one speaker embedding comprises selecting the at least one speaker embedding based on the size of the target IoT device, the complexity, the audio scene and the operating state of the target IoT device.

2. The method as claimed in claim 1, further comprising obtaining acoustic information from the non-speech information and identifying the audio scene based on the acoustic information.

3. The method as claimed in claim 2, wherein the obtaining of the acoustic information from the non-speech information comprises:
  determining one or more audio events of the environment in which the one or more IoT devices operate, wherein the one or more audio events of the environment correspond to the acoustic information.

4. The method as claimed in claim 1, wherein the generating of the one or more contextual parameters comprises selecting a voice embedding from the at least one speaker embedding for playback by the target IoT device of the one or more IoT devices.

5. The method as claimed in claim 1, further comprising:
  collecting a plurality of audio samples from a plurality of speakers to generate one or more speaker embeddings; and
  storing the generated one or more speaker embeddings in the database for selection of the one or more speaker embeddings for the one or more IoT devices.

6. The method as claimed in claim 5, further comprising:
  artificially infusing a human emotion into the generated one or more speaker embeddings, wherein the generated one or more speaker embeddings include different types of voice tones and textures for the plurality of audio samples; and
  storing the generated one or more speaker embeddings with human emotions in the database.

7. The method as claimed in claim 1, further comprising:
  extracting a device specific information for each of the one or more IoT devices operating in the environment;
  correlating the device specific information for each of the one or more IoT devices with the at least one speaker embedding to generate a map of a set of speaker embeddings for each of the one or more IoT devices;
  assigning a distinct voice from the set of speaker embeddings to each of the one or more IoT devices based on the correlation; and
  storing the assigned set of speaker embeddings into the database as the map for selection of encoded speaker embeddings for the one or more IoT devices.

8. The method as claimed in claim 1, further comprising:
  extracting a device specific information for each of the one or more IoT devices operating in the environment;
  identifying similar IoT devices from the one or more IoT devices operating in the environment based on the device specific information for each of the one or more IoT devices;
  correlating the device specific information for each of the one or more IoT devices with the at least one speaker embedding to generate a map of a set of speaker embeddings for each of the identified similar IoT devices;
  assigning a distinct voice to each of the identified similar IoT devices included in the set of speaker embeddings; and
  storing the assigned set of speaker embeddings into the database as the map for selection of the speaker embeddings for the one or more IoT devices.

9. The method as claimed in claim 1, wherein the analyzing of the result of the NLP comprises:
  determining one of success, failure, or follow-up of an IoT event on the target IoT device due to the user command or device specific events.

10. The method as claimed in claim 1, wherein the generating of the one or more contextual parameters comprises identifying an audio scene of the target IoT device based on the non-speech information and generating a contextual parameter corresponding to the audio scene, and
  wherein the audio scene indicates information of the environment in which the target IoT device operates.

11. An interactive computing system comprising:
  one or more processors; and
  a memory configured to store instructions executable by the one or more processors; and
  wherein the one or more processors are configured to:
  receive an audio input including a user command of a user and a sound from an environment in which one or more IoT devices operate, the user command including a task and information on a target IoT device for performing the task among the one or more IoT devices;
  classify the audio input into speech information and non-speech information, wherein the non-speech information corresponds to the sound from the environment in which the one or more IoT devices operate;
  receive information of an event on the target IoT device;
  perform natural language processing (NLP) on the speech information and the information of the event on the target IoT device to obtain a result of the NLP;
  fetch a device specific information of the target IoT from the target IoT among the one or more IoT devices operating in the environment based on the result of the NLP;
  analyze the result of the NLP;
  generate one or more contextual parameters based on the non-speech information, the device specific information of the target IoT device and the analyzed result of the NLP;
  select at least one speaker embedding stored in a database for the one or more IoT devices based on the one or more contextual parameter;
  output the selected at least one speaker embedding for playback to the user; and
  process the selected at least one speaker embedding based on a text to speech mechanism to playback in a natural language to the user,
  wherein the one or more contextual parameters include:
    a size of the target IoT device,
    a complexity determined based on dependency of another IoT device of the one or more IoT devices on an operation of the target IoT device,
    an audio scene indicating a location in which the target IoT device operates, and
    an operating state of the target IoT device, and
  wherein the one or more processors are further configured to select the at least one speaker embedding based on the size of the target IoT device, the complexity, the audio scene and the operating state of the target IoT device.

12. The system as claimed in claim 11, wherein the one or more processors are further configured to obtain acoustic information from the non-speech information and identify the audio scene based on the acoustic information.

13. The system as claimed in claim 12, wherein the one or more processors are further configured to:
determine one or more audio events of the environment in which the one or more IoT devices operate, wherein the one or more audio events of the environment correspond to the acoustic information.

14. The system as claimed in claim 11, wherein the one or more processors are further configured to select a voice embedding from the at least one speaker embedding for playback by the target IoT device of the one or more IoT devices.

15. The system as claimed in claim 11, wherein the one or more processors are further configured to:
collect a plurality of audio samples from a plurality of speakers to generate one or more speaker embeddings; and
store the generated one or more speaker embeddings with human emotions in the database for selection of the one or more speaker embeddings for the one or more IoT devices.

16. The system as claimed in claim 15, wherein the one or more processors are further configured to:
artificially infuse a human emotion into the generated one or more speaker embeddings, wherein the generated one or more speaker embeddings include different types of voice tones and textures for the plurality of audio samples; and
store the generated one or more speaker embeddings with human emotions in the database.

17. The system as claimed in claim 11, wherein the one or more processors are further configured to:
extract a device specific information for each of the one or more IoT devices operating in the environment;
correlate the device specific information for each of the one or more IoT devices with the at least one speaker embedding to generate a map of a set of speaker embeddings for each of the IoT devices;
assign a distinct voice from the set of speaker embeddings to each of the one or more IoT devices based on the correlation; and
store the assigned set of speaker embeddings into the database as the map for selection of encoded speaker embeddings for the one or more IoT devices.

18. The system as claimed in claim 11, wherein the one or more processors are further configured to:
extract a device specific information for each of the one or more IoT devices operating in the environment;
identify similar IoT devices from the one or more IoT devices operating in the environment based on the device specific information for each of the one or more IoT devices;
correlate the device specific information for each of the one or more IoT devices with the at least one speaker embedding to generate a map of a set of speaker embeddings for each of the identified similar IoT devices;
assign a distinct voice to each of the identified similar IoT devices included in the set of speaker embeddings; and
store the assigned set of speaker embeddings into the database as the map for selection of the speaker embeddings for the one or more IoT devices.

19. The system as claimed in claim 11, wherein the one or more processors are further configured to:
determine one of success, failure, or follow-up of an IoT event on the target IoT device due to the user command or device specific events.

20. The system as claimed in claim 11, wherein the one or more processors are further configured to identify an audio scene of the target IoT device based on the non-speech information and generate a contextual parameter corresponding to the audio scene, and
wherein the audio scene indicates information of the environment in which the target IoT device operates.

* * * * *